(12) United States Patent
Horiguchi

(10) Patent No.: US 12,504,508 B2
(45) Date of Patent: Dec. 23, 2025

(54) RADAR DEVICE

(71) Applicant: Mitsubishi Electric Corporation, Tokyo (JP)

(72) Inventor: Takahiro Horiguchi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 296 days.

(21) Appl. No.: 18/217,867

(22) Filed: Jul. 3, 2023

(65) Prior Publication Data

US 2023/0350012 A1    Nov. 2, 2023

Related U.S. Application Data

(63) Continuation of application No. PCT/JP2022/014039, filed on Mar. 24, 2022.

(30) Foreign Application Priority Data

Mar. 25, 2021   (WO) .................. PCT/JP2021/012652

(51) Int. Cl.
  *G01S 7/35*    (2006.01)
  *G01S 13/58*   (2006.01)

(52) U.S. Cl.
  CPC ............ *G01S 7/354* (2013.01); *G01S 13/584* (2013.01)

(58) Field of Classification Search
  CPC .... G01S 13/931; G01S 13/584; G01S 13/343; G01S 13/345; G01S 13/34; G01S 13/347; G01S 13/38

(Continued)

(56) References Cited

U.S. PATENT DOCUMENTS 5,920,280 A * 7/1999 Okada .................. G01S 13/345
                                                342/128
6,492,938 B1 * 12/2002 Alland .................. G01S 13/345
                                                342/72

(Continued)

FOREIGN PATENT DOCUMENTS

DE    10 2013 200 404 A1    7/2014
DE    10 2013 212 664 A1    12/2014

(Continued)

OTHER PUBLICATIONS

International Search Report (PCT/ISA/210), issued in PCT/JP2021/012652, dated May 11, 2021.

(Continued)

*Primary Examiner* — Michael W Justice
(74) *Attorney, Agent, or Firm* — Birch, Stewart, Kolasch & Birch, LLP

(57) ABSTRACT

A radar device includes a radar signal output unit outputs a first frequency modulation signal that changes in frequency with a first chirp slope and repeats in a first chirp period, and a second frequency modulation signal that changes in frequency with a second chirp slope different from the first chirp slope and repeats in a first chirp period; a signal processing unit determines the target in the first frequency modulation signal and the target in the second frequency modulation signal as pseudo targets in a case where a beat frequency of the target in the first frequency modulation signal matches a beat frequency of the target in the second frequency modulation signal, and a Doppler frequency of the target in the second frequency modulation signal matches a Doppler frequency of the target in the second frequency modulation signal.

6 Claims, 27 Drawing Sheets

(58) Field of Classification Search
USPC .................................. 342/112, 192, 128, 70
See application file for complete search history.

(56) References Cited

U.S. PATENT DOCUMENTS

| | | | | |
|---|---|---|---|---|
| 6,606,052 | B1* | 8/2003 | Miyahara | G01S 13/584 |
| | | | | 342/107 |
| 6,711,219 | B2* | 3/2004 | Thomas | H04B 1/7107 |
| | | | | 375/E1.032 |
| 7,286,078 | B2* | 10/2007 | Mayer | G01S 7/4004 |
| | | | | 342/195 |
| 8,311,074 | B2* | 11/2012 | McCorkle | H04B 1/7174 |
| | | | | 375/135 |
| 8,743,927 | B2* | 6/2014 | McCorkle | H04B 1/7174 |
| | | | | 375/135 |
| 8,988,275 | B2* | 3/2015 | Kisliansky | G01S 13/56 |
| | | | | 342/28 |
| 9,354,304 | B2* | 5/2016 | Kirsch | G01S 13/347 |
| 9,791,549 | B2* | 10/2017 | Bi | G01S 13/343 |
| 10,404,261 | B1* | 9/2019 | Josefsberg | G01S 13/931 |
| 11,215,692 | B2* | 1/2022 | Itkin | G01S 13/931 |
| 11,500,062 | B2* | 11/2022 | Zhang | G06F 3/162 |
| 12,111,414 | B2* | 10/2024 | Trummer | G01S 7/411 |
| 2004/0017867 | A1* | 1/2004 | Thomas | H04B 1/7107 |
| | | | | 375/E1.032 |
| 2006/0156076 | A1* | 7/2006 | Mayer | G01S 13/931 |
| | | | | 714/55 |
| 2011/0122921 | A1* | 5/2011 | McCorkle | H04B 1/7174 |
| | | | | 375/E1.001 |
| 2011/0267219 | A1* | 11/2011 | Kisliansky | G01S 13/426 |
| | | | | 342/159 |
| 2012/0320946 | A1* | 12/2012 | Mccorkle | H04B 1/7174 |
| | | | | 375/E1.001 |
| 2013/0106646 | A1* | 5/2013 | Kitagawa | G01S 13/931 |
| | | | | 342/87 |
| 2014/0253365 | A1* | 9/2014 | Kirsch | G01S 13/58 |
| | | | | 342/112 |
| 2015/0002332 | A1* | 1/2015 | Bi | G01S 13/02 |
| | | | | 342/385 |
| 2017/0131397 | A1* | 5/2017 | Schoor | G01S 13/0209 |
| 2018/0095163 | A1* | 4/2018 | Lovberg | G01S 13/325 |
| 2019/0293749 | A1* | 9/2019 | Itkin | G01S 13/931 |
| 2019/0383907 | A1* | 12/2019 | Belsley | G01S 17/50 |
| 2020/0025868 | A1* | 1/2020 | Trummer | G01S 13/931 |
| 2021/0208272 | A1* | 7/2021 | Lavian | H03L 7/091 |
| 2022/0308197 | A1* | 9/2022 | Kitsukawa | G01S 13/87 |

FOREIGN PATENT DOCUMENTS

| | | |
|---|---|---|
| JP | 2013-96903 A | 5/2013 |
| JP | 2017-522577 A | 8/2017 |
| JP | 2019-74424 A | 5/2019 |
| JP | 6797334 B1 | 12/2020 |

OTHER PUBLICATIONS

International Search Report (PCT/ISA/210), issued in PCT/JP2022/014039, dated Jun. 7, 2022.
German Office Action for the German Application No. 11 2022 000 734.6, dated May 8, 2024, with an English translation.

* cited by examiner

RADAR DEVICE

CROSS REFERENCE TO RELATED APPLICATIONS

This application is a Continuation of PCT International Application No. PCT/JP2022/014039, filed on Mar. 24, 2022, which claims priority under 35 U.S.C. 119(a) to International Patent Application No. PCT/JP2021/012652, filed on Mar. 25, 2021, all of which are hereby expressly incorporated by reference into the present application.

TECHNICAL FIELD

The present disclosure relates to a radar device that calculates a range to a target and a relative speed with respect to the target.

BACKGROUND ART

As a radar device that calculates a range to a target and a relative speed with respect to the target, there is a radar device of a frequency modulated continuous wave (FMCW) system that transmits a radar signal whose frequency changes with the lapse of time. Since the FMCW system radar device may erroneously detect an external radio wave or electromagnetic noise (hereinafter, electromagnetic noise) outside the radar signal band as a pseudo target, a countermeasure using hardware such as electromagnetic shielding is generally applied to suppress the influence of the electromagnetic noise on the radar device. However, there is a problem that not only the cost increases due to the countermeasure component but also the weight, volume, and the like of the entire radar device increase.

On the other hand, a method of discriminating and removing a pseudo target due to electromagnetic noise by radar signal processing instead of using a countermeasure component is disclosed. Patent Literature 1 discloses a radar device having a first measurement mode in which a frequency of a transmission wave to be transmitted changes at a preset first change rate and a second measurement mode in which the frequency changes at a second change rate different from the first change rate. The radar device disclosed in Patent Literature 1 determines that the electromagnetic noise is mixed when the peak signal component extracted during the operation in the first measurement mode and the peak signal component extracted in the second measurement mode have at least substantially the same frequency.

CITATION LIST

Patent Literature

Patent Literature 1: JP 2013-96903 A

SUMMARY OF INVENTION

Technical Problem

Among radars of the FMCW system, there is a system called fast chirp modulation (FCM) in which a beat signal obtained using a radar signal that intermittently and repeatedly outputs a frequency modulation signal is frequency-analyzed, and a range and a relative speed are calculated from a beat frequency corresponding to a range and a Doppler frequency corresponding to a relative speed.

The FCM system has been widely used in recent years because it has advantages of improvement in identification accuracy of a relative speed and improvement in identification capability in a multi-target environment. However, in the FCM system, when a pseudo target due to electromagnetic noise is distinguished using a detection result of transmission waves having modulation patterns with different gradients, there is a problem that Doppler frequencies of peak signal components due to the electromagnetic noise may not match even for transmission waves having modulation patterns with different frequency change rates in the FCM system, and it is not possible to determine whether or not the pseudo target due to the electromagnetic noise is present only by matching the frequencies.

The present disclosure solves the above problem, and an object thereof is to obtain a radar device capable of determining and removing a pseudo target due to electromagnetic noise by signal processing of a radar without introducing countermeasures against electromagnetic noise by electromagnetic shielding or the like.

Solution to Problem

A radar device according to the present disclosure includes: processing circuitry performing a process: to repeatedly output a frequency modulation signal;
to transmit the frequency modulation signal toward a target and receive a reflected wave from the target; to generate a beat signal having a frequency of a difference between a frequency of the frequency modulation signal and a frequency of the reflected wave and convert the beat signal into digital data; and to calculate a beat frequency corresponding to a range to the target and a Doppler frequency corresponding to a relative speed with respect to the target by using the digital data to detect the range and the relative speed of the target, wherein the process outputs a first frequency modulation signal that changes in frequency with a preset first chirp slope and repeats in a preset first chirp period, a second frequency modulation signal that changes in frequency with a second chirp slope different from the first chirp slope and repeats in the first chirp period, and a third frequency modulation signal that changes in frequency with the second chirp slope and repeats in a second chirp period different from the first chirp period, and the process determines the target in the first frequency modulation signal and the target in the second frequency modulation signal as pseudo targets in a case where a beat frequency of the target in the first frequency modulation signal matches a beat frequency of the target in the second frequency modulation signal, and a Doppler frequency of the target in the first frequency modulation signal matches a Doppler frequency of the target in the second frequency modulation signal, wherein it is determined that the target in the first frequency modulation signal and the target in the second frequency modulation signal determined to be the pseudo targets are true targets in a case where a range of the target in the second frequency modulation signal matches a range of the target in the third frequency modulation signal, and a relative speed of the target in the second frequency modulation signal matches a relative speed of the target in the third frequency modulation signal, among the targets determined to be the pseudo targets in the first frequency modulation signal and the second frequency modulation signal.

Advantageous Effects of Invention

According to the present disclosure, it is possible to determine and remove a pseudo target due to electromagnetic noise by signal processing of a radar without introducing countermeasures against electromagnetic noise by an electromagnetic shielding or the like into an FCM system radar device.

BRIEF DESCRIPTION OF DRAWINGS

FIG. 3 is a hardware configuration diagram of a computer in a case where the signal processing unit 22 in the radar device according to the first embodiment is implemented by software, firmware, or the like.

DESCRIPTION OF EMBODIMENTS

First Embodiment

Figure 1:
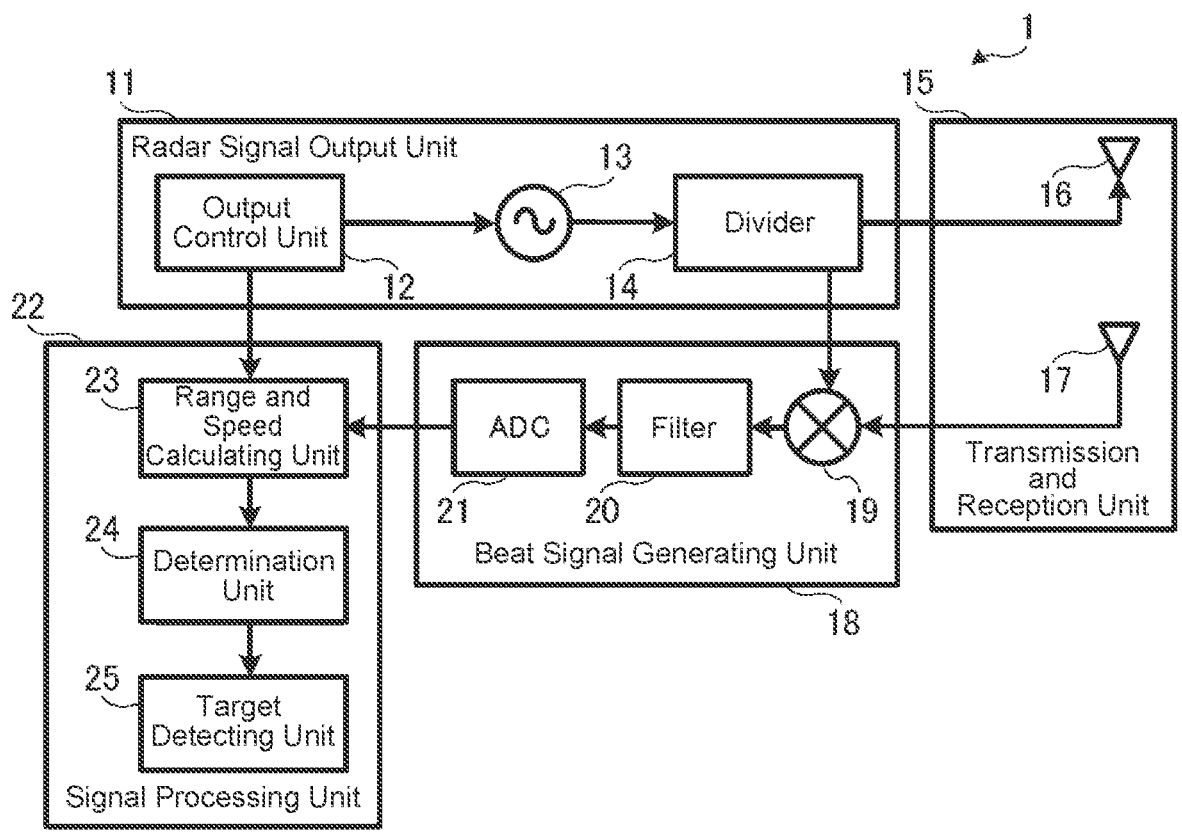
FIG. 1 is a configuration diagram illustrating a radar device according to a first embodiment.

FIG. 1 is a configuration diagram of a radar device according to the present embodiment.

In FIG. 1, a radar device 1 includes a radar signal output unit 11, a transmission and reception unit 15, a beat signal generating unit 18, and a signal processing unit 22.

The radar signal output unit 11 includes an output control unit 12, a signal source 13, and a divider 14.

The output control unit 12 outputs a control signal indicating a modulation command and an output timing of a frequency modulation signal to the signal source 13.

The signal source 13 intermittently and repeatedly outputs the frequency modulation signal as a radar signal to the divider 14 in accordance with the modulation command and output timing indicated by the control signal output from the output control unit 12.

The divider 14 divides each of the radar signals repeatedly output from the signal source 13 into two. The divider 14 outputs one of the divided radar signals to a transmission antenna 16, and outputs the other of the divided radar signals to a beat signal generating unit 18 as a local oscillation signal.

As described above, the radar signal output unit 11 intermittently and repeatedly outputs the frequency modulation signal whose frequency changes with the lapse of time to the transmission and reception unit 15 as a radar signal.

The transmission and reception unit 15 includes a transmission antenna 16 and a reception antenna 17, transmits the radar signal repeatedly output from the radar signal output unit 11 toward a target, and receives each radar signal reflected by the target as a reflected wave.

The transmission antenna 16 radiates each radar signal repeatedly output from the radar signal output unit 11 into space.

After each radar signal is radiated from the transmission antenna 16 into space, the reception antenna 17 receives each radar signal reflected by the target as a reflected wave, and outputs a reception signal of each received reflected wave to the beat signal generating unit 18.

Note that, in the present embodiment, the transmission and reception unit 15 in which the transmission antenna 16 is directly connected to the divider 14 has been described, but this is merely an example, and an amplifier may be connected between the divider 14 and the transmission antenna 16, and the amplifier may amplify the radar signal output from the divider 14 and output the amplified radar signal to the transmission antenna 16.

Furthermore, similarly, the transmission and reception unit 15 in which the reception antenna 17 is directly connected to a frequency mixing unit 19 has been described, but this is merely an example, and an amplifier may be connected between the reception antenna 17 and the frequency mixing unit 19, and the amplifier may amplify the reception signal output from the reception antenna 17 and output the amplified reception signal to the frequency mixing unit 19.

The beat signal generating unit 18 includes a frequency mixing unit 19, a filter unit 20, and an analog to digital converter (ADC) 21.

The frequency mixing unit 19 mixes the local oscillation signal output from the divider 14 and the reception signal output from the reception antenna 17 to generate a beat signal having a frequency of a difference between the frequency of the local oscillation signal output from the divider 14 and the frequency of the reception signal, and outputs the beat signal to the filter unit 20.

The filter unit 20 is implemented by a low pass filter (LPF), a band pass filter (BPF), or the like, suppresses an unnecessary component such as spurious included in the beat signal output from the frequency mixing unit 19, and outputs the beat signal after the unnecessary component suppression to the ADC 21.

The ADC 21 converts the beat signal output from the filter unit 20 into digital data and outputs the digital data to the signal processing unit 22.

The signal processing unit 22 includes a range and speed calculating unit 23, a determination unit 24, and a target detecting unit 25.

The range and speed calculating unit 23 calculates each of the beat frequency and the Doppler frequency by using a plurality of pieces of digital data output from the ADC 21 of the beat signal generating unit 18, and further calculates each of the range to the target and the relative speed with respect to the target.

The range and speed calculating unit 23 outputs each of the calculated values of the beat frequency, the Doppler frequency, the range, and the relative speed to the determination unit 24.

Figure 4:
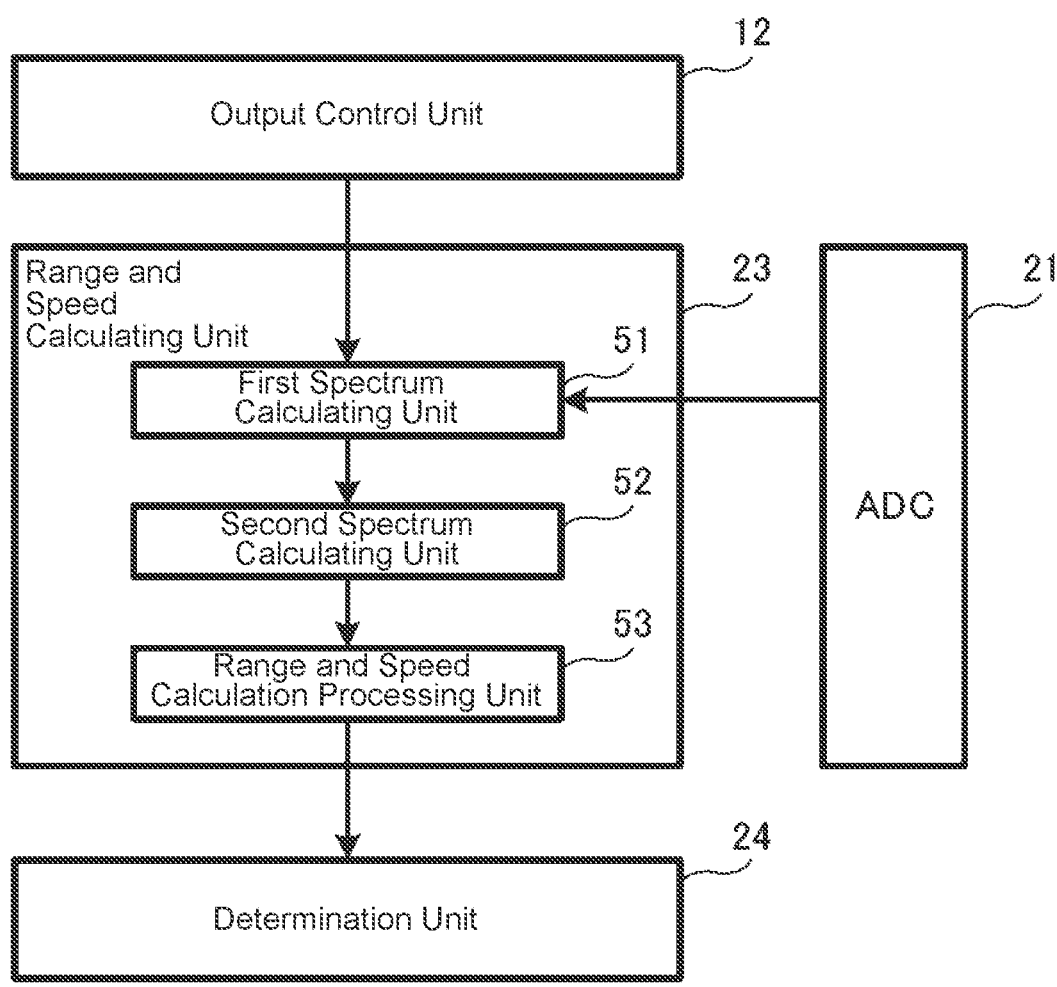
FIG. 4 is a configuration diagram illustrating an example of a range and speed calculating unit 23.

An example of the range and speed calculating unit 23 is illustrated in FIG. 4. In FIG. 4, reference numeral 51 denotes a first spectrum calculating unit, reference numeral 52 denotes a second spectrum calculating unit, and reference numeral 53 denotes a range and speed calculation processing unit.

The first spectrum calculating unit 51 repeatedly acquires the digital data output from the ADC 21 in synchronization with the output timing indicated by the control signal output from the output control unit 12, and repeatedly calculates the first frequency spectrum by performing Fourier transform on each digital data in the range direction.

In addition, the first spectrum calculating unit 51 outputs each of the repeatedly calculated first frequency spectra to the second spectrum calculating unit 52.

The second spectrum calculating unit 52 repeatedly acquires K (K is an integer equal to or more than 2) first frequency spectra from the first spectrum calculating unit 51.

Every time the K first frequency spectra are acquired, the second spectrum calculating unit 52 calculates the second frequency spectrum by performing Fourier transform on the K first frequency spectra in the Doppler direction, and outputs the second frequency spectrum to the range and speed calculation processing unit 53.

In addition, the second spectrum calculating unit 52 integrates the K first frequency spectra and outputs the integrated first frequency spectrum to the range and speed calculation processing unit 53.

The range and speed calculation processing unit 53 detects a beat frequency, which is a frequency corresponding to the peak value of the integrated first frequency spectrum output from the second spectrum calculating unit 52, and calculates the range to the target.

The range and speed calculation processing unit 53 detects a Doppler frequency that is a frequency corresponding to the peak value of the second frequency spectrum output from the second spectrum calculating unit 52.

In addition, the range and speed calculation processing unit 53 calculates the relative speed with respect to the target from the detected Doppler frequency.

Finally, the range and speed calculation processing unit 53 outputs each of the calculated range to the target and the calculated relative speed with respect to the target to the determination unit 24.

On the basis of the beat frequency calculated by the range and speed calculating unit 23 and the Doppler frequency calculated by the range and speed calculating unit 23, the determination unit 24 determines whether or not the target is caused by electromagnetic noise having a constant frequency.

Note that the electromagnetic noise having a constant frequency is not limited to electromagnetic noise having a frequency that does not change at all, and is assumed to include electromagnetic noise having a frequency that changes slightly within a practically acceptable range, for example, an electromagnetic wave of a continuous wave (CW).

When determining that the target is not caused by the electromagnetic noise, the determination unit 24 outputs each of the range and the relative speed calculated by the range and speed calculating unit 23 to the target detecting unit 25.

The target detecting unit 25 acquires each of the range and the relative speed output from the determination unit 24.

The target detecting unit 25 outputs each of the acquired range and relative speed to the outside of the radar device 1 as a target detection result.

Figure 2:
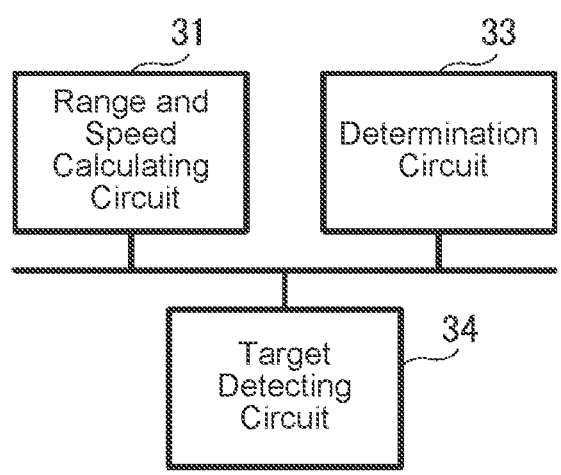
FIG. 2 is a hardware configuration diagram illustrating hardware of a signal processing unit 22 in the radar device according to the first embodiment.

In the present embodiment, it is assumed that each of the range and speed calculating unit 23, the determination unit 24, and the target detecting unit 25, which are components of the signal processing unit 22, is implemented by dedicated hardware as illustrated in FIG. 2. That is, it is assumed that the signal processing unit 22 is implemented by a range and speed calculating circuit 31, a determination circuit 32, and a target detecting circuit 33.

Here, each of the range and speed calculating circuit 31, the determination circuit 32, and the target detecting circuit 33 corresponds to, for example, a single circuit, a composite circuit, a programmed processor, a parallel-programmed processor, an application specific integrated circuit (ASIC), a field-programmable gate array (FPGA), or a combination thereof.

The components of the signal processing unit 22 are not limited to those implemented by dedicated hardware, but the signal processing unit 22 may be implemented by software, firmware, or a combination of software and firmware.

The software or firmware is stored in a memory of a computer as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 3:
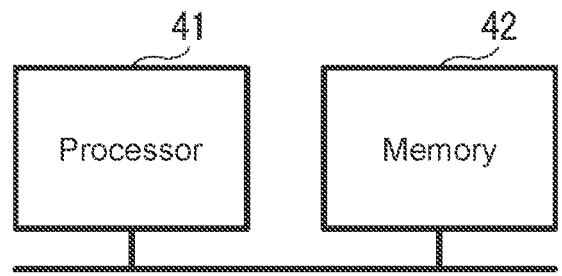

FIG. 3 is a hardware configuration diagram of a computer in a case where the signal processing unit 22 is implemented by software, firmware, or the like.

In a case where the signal processing unit 22 is implemented by software, firmware, or the like, a program for causing a computer to execute processing procedures of the range and speed calculating unit 23, the determination unit 24, and the target detecting unit 25 is stored in a memory 41. Then, the processor 42 of the computer executes the program stored in the memory 41.

Furthermore, FIG. 2 illustrates an example in which each of the components of the signal processing unit 22 is implemented by dedicated hardware, and FIG. 3 illustrates an example in which the signal processing unit 22 is implemented by software, firmware, or the like. However, this is merely an example, and some components in the signal processing unit 22 may be implemented by dedicated hardware, and the remaining components may be implemented by software, firmware, or the like.

Next, an operation of the radar device 1 according to the present embodiment and generation of a pseudo target due to electromagnetic noise will be described. Note that, in the present embodiment, a pseudo target generated by inputting electromagnetic noise to the ADC 21 will be described.

Figure 6:
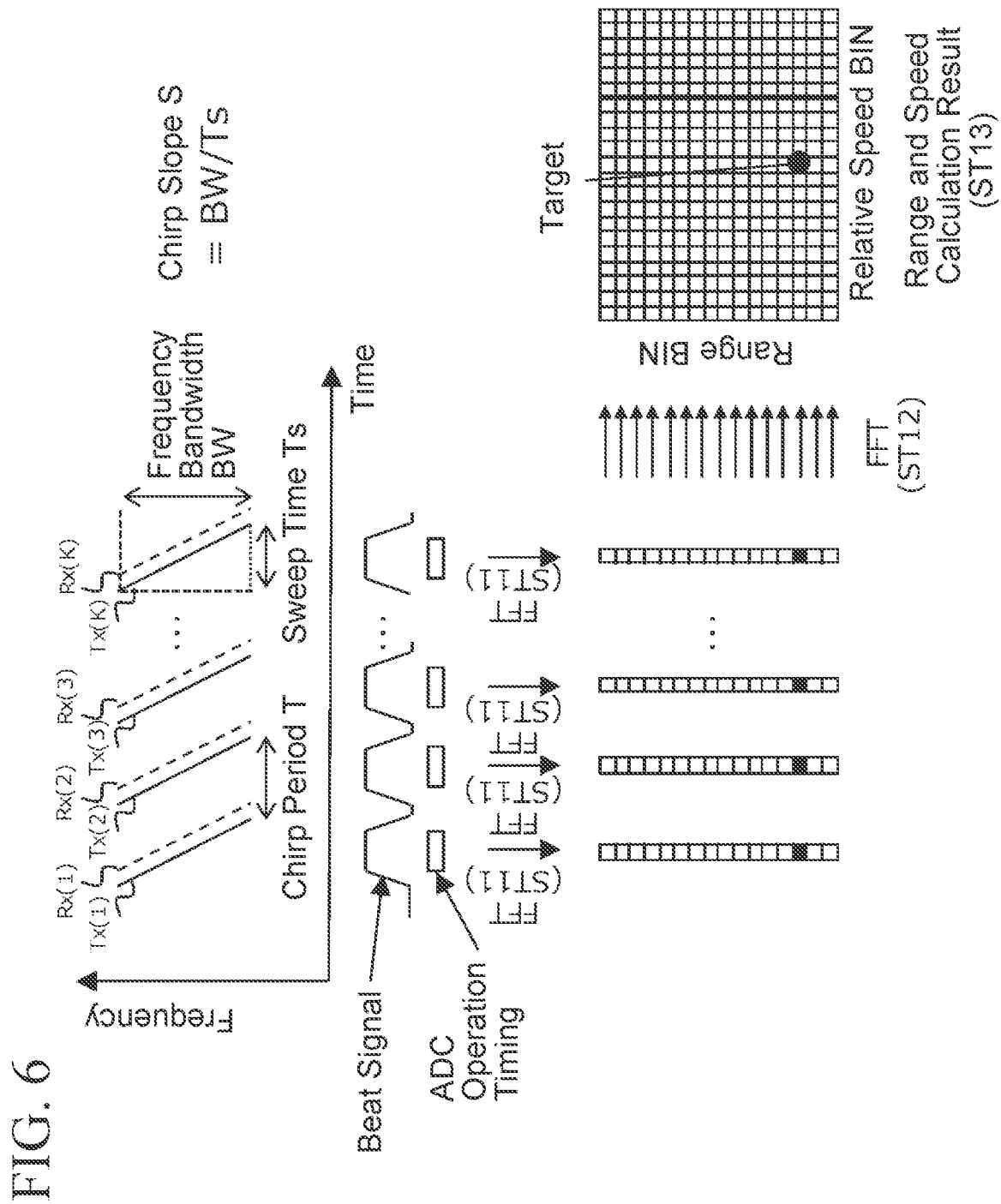
FIG. 6 is an explanatory diagram illustrating signal processing of the range and speed calculating unit 23 in a case where there is no electromagnetic noise.
Figure 7:
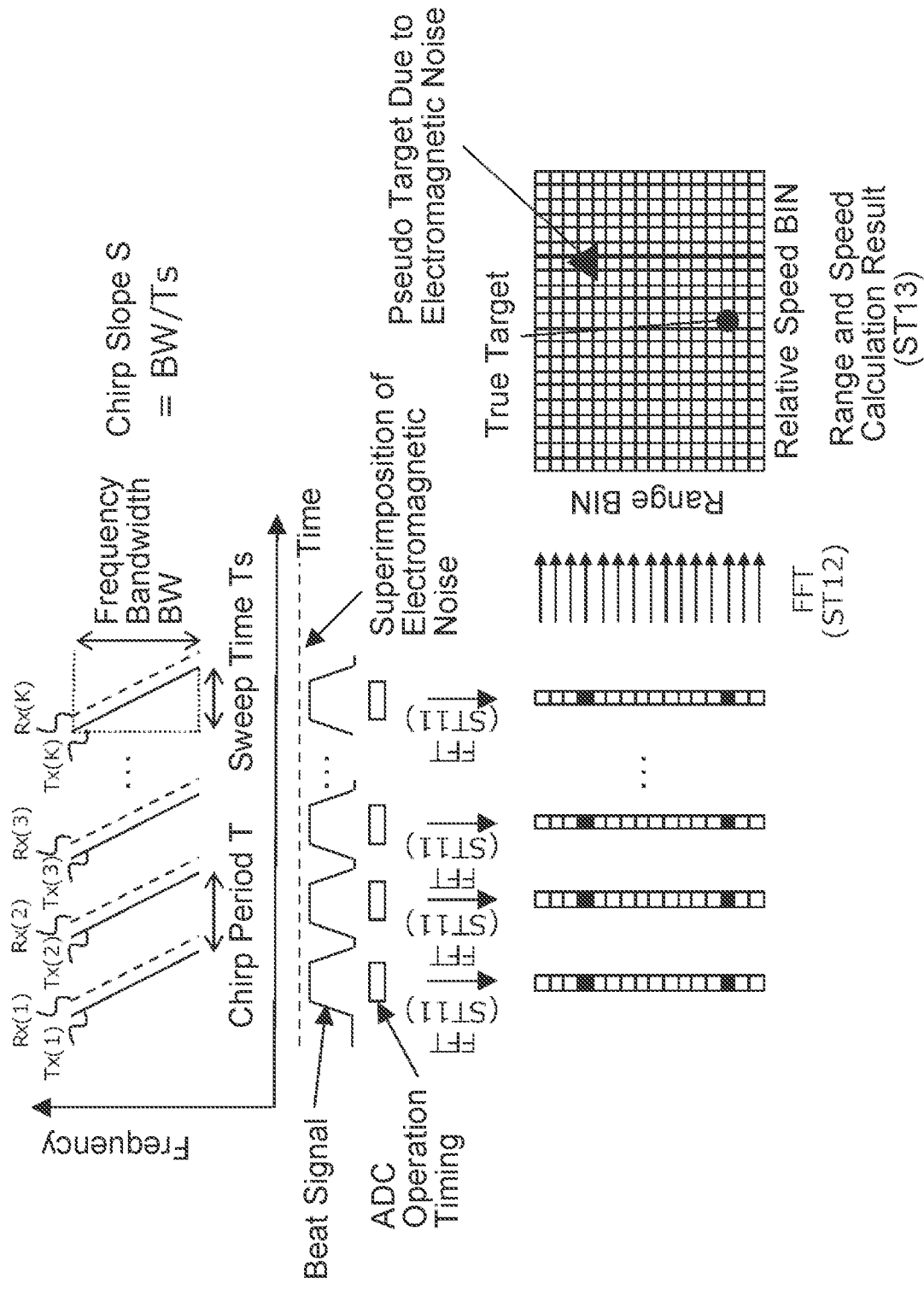
FIG. 7 is an explanatory diagram illustrating signal processing of the range and speed calculating unit 23 in a case where there is electromagnetic noise.

FIG. 6 is an explanatory diagram illustrating the radar signal, the reception signal, the beat signal, and signal processing of the range and speed calculating unit 23 in a single operation mode. FIG. 7 is an explanatory diagram illustrating the radar signal, the reception signal, the beat signal, and signal processing of the range and speed calculating unit 23 in a case where electromagnetic noise is input to the ADC 21 in a single operation mode. In FIGS. 6 and 7, Tx(1), Tx(2), Tx(3), . . . , and Tx(K) represent radar signals, and Rx(1), Rx(2), Rx(3), . . . , and Rx(K) represent reception signals.

The radar signal Tx(k) (k=1, K) is a frequency modulation signal whose frequency changes with the lapse of time. Ts is a sweep time of the radar signal Tx(k) and is time of us (microsecond) order. BW is a frequency bandwidth of the radar signal Tx(k). The time rate of change (chirp slope) S of the frequency of the radar signal is expressed by BW/Ts.

The output control unit 12 outputs a control signal indicating the output timing of the radar signal Tx(k) to each of the signal source 13 and the range and speed calculating unit 23.

As illustrated in FIGS. 6 and 7, the output timing of the radar signal Tx(k) is a time interval (chirp period T) longer than the sweep time Ts.

The signal source 13 repeatedly outputs the radar signal Tx(k) to the divider 14 in accordance with the output timing indicated by the control signal output from the output control unit 12.

Every time the radar signal Tx(k) is received from the signal source 13, the divider 14 divides the radar signal Tx(k) into two.

The divider 14 outputs one of the divided radar signals Tx(k) to the transmission antenna 16, and outputs the other of the divided radar signals Tx(k) to the frequency mixing unit 19 as a local oscillation signal Lo(k).

Every time the radar signal Tx(k) is received from the divider 14, the transmission antenna 16 radiates the radar signal Tx(k) into space.

After the radar signal Tx(k) is radiated from the transmission antenna 16 into space, the reception antenna 17 receives the radar signal Tx(k) reflected by the target as a reflected wave, and outputs a reception signal Rx(k) of the received reflected wave to the frequency mixing unit 19.

Every time the local oscillation signal Lo(k) is received from the divider 14 and the reception signal Rx(k) is received from the reception antenna 17, the frequency mixing unit 19 mixes the local oscillation signal Lo(k) and the reception signal Rx(k).

The frequency mixing unit 19 mixes the local oscillation signal Lo(k) and the reception signal Rx(k) to generate a beat signal having a frequency of a difference between the frequency of the local oscillation signal Lo(k) and the frequency of the reception signal Rx(k). Then, every time the frequency mixing unit 19 generates the beat signal, it outputs the generated beat signal to the filter unit 20.

Every time the beat signal is received from the frequency mixing unit 19, the filter unit 20 suppresses an unnecessary component such as spurious included in the beat signal and outputs the beat signal after the suppression of the unnecessary component to the ADC 21. Every time the beat signal is received from the filter unit 20, the ADC 21 converts the beat signal into digital data and outputs the digital data to the range and speed calculating unit 23. At this time, when the electromagnetic noise is input to the ADC 21, the electromagnetic noise may be superimposed on the beat signal (superimposition of the electromagnetic noise) as illustrated in FIG. 7. Note that the operation period (ADC operation timing) of the ADC 21 corresponds to a period in which the frequency mixing unit 19 outputs the beat signal to the filter unit 20.

The range and speed calculating unit 23 calculates each of the range to the target and the relative speed with respect to the target using a plurality of pieces of digital data repeatedly output from the ADC 21. The range and speed calculating unit 23 outputs each of the calculated range and relative speed to the determination unit 24.

Figure 5:
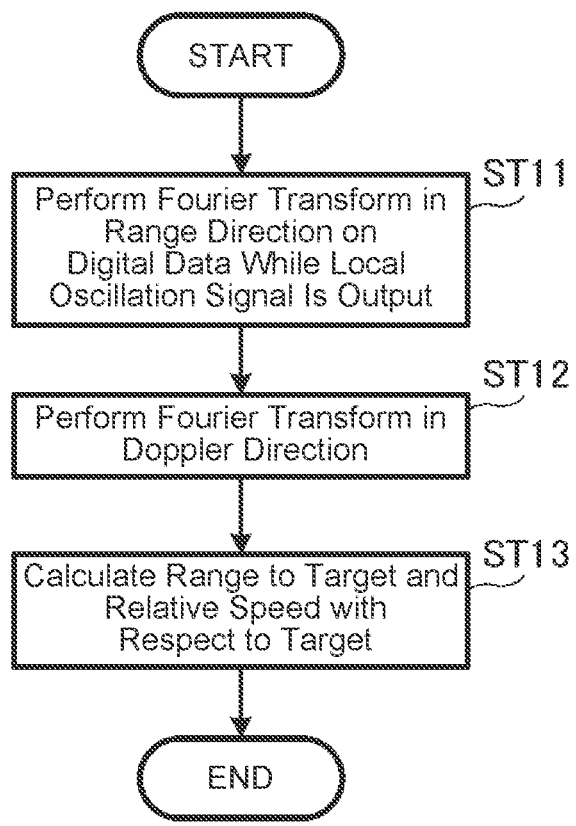
FIG. 5 is a flowchart illustrating a processing procedure of the range and speed calculating unit 23.

A processing procedure of the range and speed calculating unit 23 will be described with reference to a flowchart of FIG. 5.

In step ST11, the first spectrum calculating unit 51 repeatedly acquires the digital data output from the ADC 21 during the period in which the local oscillation signal Lo(k) is output from the divider 14 in synchronization with the output timing indicated by the control signal output from the output control unit 12.

Every time the digital data is acquired from the ADC 21, the first spectrum calculating unit 51 calculates the first frequency spectrum by performing Fourier transform on the digital data in the range direction.

Step ST11 is a portion indicated by "FFT (ST11)" in FIGS. 6 and 7, and indicates the fast Fourier transform (FFT) in the range direction by the first spectrum calculating unit 51.

As the digital data is Fourier-transformed in the range direction, the spectrum value of the reception signal Rx(k) (k=1, K) of the reflected wave from the target is integrated into the beat frequency $F_{sb\_r}$ shown in the following Formula (1).

$$F_{sb\_r} = \frac{2BW \cdot R}{c \cdot T_s} = \frac{2S \cdot R}{c} \qquad (1)$$

In Formula (1), R is a range from the radar device 1 illustrated in FIG. 1 to the target, and c is a speed of light.

Similarly, the spectrum value caused by the electromagnetic noise is integrated into the frequency $F_{n\_r}$ of the electromagnetic noise. When the frequency of the electromagnetic noise is constant, the spectrum value of the electromagnetic noise has a constant value regardless of the chirp slope S.

Every time the K first frequency spectra are calculated, the first spectrum calculating unit 51 outputs the K first frequency spectra to the second spectrum calculating unit 52.

In step ST12, the second spectrum calculating unit 52 repeatedly acquires K first frequency spectra from the first spectrum calculating unit 51.

Every time the K first frequency spectra are acquired, the second spectrum calculating unit 52 calculates the second frequency spectrum by performing Fourier transform on the K first frequency spectra in the Doppler direction.

Step ST12 is a portion indicated by "FFT (ST12)" in FIGS. 6 and 7, and indicates the Fourier transform in the Doppler direction by the second spectrum calculating unit 52. As the K first frequency spectra are Fourier-transformed in the Doppler direction, the spectrum value of the reception signal Rx(k) of the reflected wave from the target is integrated into the Doppler frequency $F_{sb\_v}$ expressed in the following Formula (2) corresponding to the relative speed between the radar device 1 and the target illustrated in FIG. 1.

$$F_{sb\_v} = \frac{2f \cdot v}{c} \qquad (2)$$

In Formula (2), f represents the center frequency of the local oscillation signal Lo(k), and v represents the relative speed between the radar device 1 illustrated in FIG. 1 and the target.

In addition, as the K first frequency spectra are Fourier-transformed in the Doppler direction, the spectrum value caused by the electromagnetic noise is integrated into the Doppler frequency $F_{n\_v}$ corresponding to the pseudo target due to the electromagnetic noise.

Figure 8:
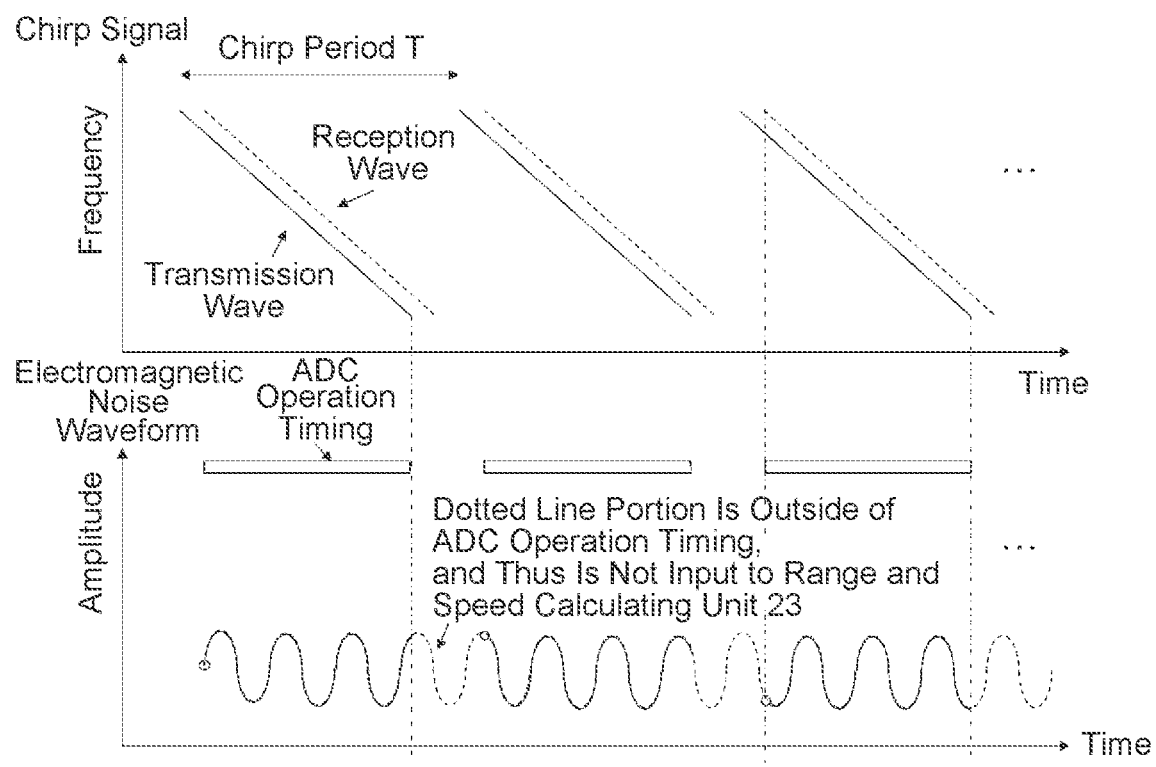
FIG. 8 is a schematic diagram illustrating a relationship between a waveform of electromagnetic noise input to an ADC 21 and a waveform of electromagnetic noise input to the range and speed calculating unit 23.

FIG. 8 is a schematic diagram illustrating a relationship between the waveform of the electromagnetic noise input to the ADC 21 and the waveform of the electromagnetic noise input to the range and speed calculating unit 23.

The electromagnetic noise input to the ADC 21 is input to the range and speed calculating unit 23 as a waveform cut out at the operation timing of the ADC 21.

An upper half graph of FIG. 8 illustrates a plurality of pieces of digital data (Horizontal axis represents time, and vertical axis represents frequency.) repeatedly output from the ADC 21 input to the range and speed calculating unit 23, and a lower half graph of FIG. 8 illustrates electromagnetic noise (Horizontal axis represents time, and vertical axis represents amplitude.) input to the ADC 21.

The waveform of the electromagnetic noise is indicated by the solid line of the graph in the lower half of FIG. 8. Since the portion of the dotted line in the middle is outside the operation timing of the ADC, the range and speed calculating unit 23 does not receive electromagnetic noise.

When the frequency of the electromagnetic noise is constant, the waveforms of the K electromagnetic noises cut out at the operation timing of the ADC 21 have a phase difference determined by the repetition period (chirp period) T of the radar signal and the frequency of the electromagnetic noise.

Therefore, the K first frequency spectra calculated from the electromagnetic noise input to the ADC 21 have phase differences determined by the chirp period and the frequency of the electromagnetic noise with respect to the adjacent first frequency spectra.

Since the Fourier transform in the Doppler direction corresponds to obtaining the phase difference between the K first frequency spectra, the Doppler frequency $F_{n\_v}$ corresponding to the relative speed of the pseudo target due to the electromagnetic noise is integrated into a value determined by the frequency of the electromagnetic noise and the chirp period T.

Therefore, when the frequency of the electromagnetic noise is constant, the Doppler frequency corresponding to the pseudo target due to the electromagnetic noise can be uniquely determined only by the chirp period T.

Every time the second frequency spectrum is calculated, the second spectrum calculating unit 52 outputs the second frequency spectrum to the range and speed calculation processing unit 53.

In addition, the second spectrum calculating unit 52 integrates the K first frequency spectra and outputs the integrated first frequency spectrum to the range and speed calculation processing unit 53.

In step ST13, the range and speed calculation processing unit 53 arranges the first frequency spectrum and the second frequency spectrum integrated by the second spectrum calculating unit 52 as a two-dimensional spectrum, and extracts a peak value in the two-dimensional spectrum.

Then, the range and speed calculation processing unit 53 detects the beat frequency $F_{sb\_r}$ corresponding to the peak value in the first frequency spectrum and the Doppler frequency $F_{sb\_v}$ corresponding to the peak value in the second frequency spectrum.

Specifically, the range and speed calculation processing unit 53 compares a plurality of spectrum values included in a two-dimensional spectrum including the first frequency spectrum and the second frequency spectrum with a threshold value Th for peak detection, and detects a spectrum value larger than the threshold value Th among the plurality of spectrum values as a peak value. The threshold Th for peak detection may be stored in the internal memory of the range and speed calculation processing unit 53 or may be given from the outside of the radar device 1.

The peak value detected in step ST13 is a portion indicated by the range and speed calculation result (ST13) in FIGS. 6 and 7. Note that, since there is no electromagnetic noise in FIG. 6, only the peak value of the target is indicated by a circle, and not only the peak value of the target but also the peak value of the electromagnetic noise is indicated by a triangle together in FIG. 7.

Note that, in the present embodiment, since the beat frequency and the Doppler frequency are used for determination of a pseudo target due to electromagnetic noise, ST13 in FIGS. 6 and 7 illustrates a result of detecting a peak value with the vertical axis representing the range BIN corresponding to the beat frequency and the horizontal axis representing the relative speed BIN corresponding to the Doppler frequency.

The peak detected by the range and speed calculation processing unit 53 corresponds to the beat frequency $F_{sb\_r}$ and the Doppler frequency $F_{sb\_v}$ related to the true target in a case where no electromagnetic noise is input to the ADC 21 (ST13 in FIG. 6), but includes a peak corresponding to the frequency $F_{n\_r}$ of the electromagnetic noise and the Doppler frequency $F_{n\_v}$ corresponding to the pseudo target due to the electromagnetic noise in a case where the electromagnetic noise is input to the ADC 21 (ST13 in FIG. 7).

When detecting the beat frequency $F_{sb\_r}$, the range and speed calculation processing unit 53 substitutes the beat frequency $F_{sb\_r}$ into the following Formula (3) to calculate the range R from the radar device 1 to the target illustrated in FIG. 2.

$$R = \frac{c \cdot T_s \cdot F_{sb\_r}}{2BW} = \frac{c \cdot F_{sb\_r}}{2S} \quad (3)$$

When detecting the Doppler frequency $F_{sb\_v}$, the range and speed calculation processing unit 53 substitutes the Doppler frequency $F_{sb\_v}$ into the following Formula (4) to calculate the relative speed v between the radar device 1 and the target illustrated in FIG. 1.

$$v = \frac{c \cdot F_{sb\_v}}{2f} \quad (4)$$

Every time the range R and the relative speed v are calculated, the range and speed calculation processing unit 53 outputs the range R and the relative speed v, and the beat frequency and the Doppler frequency corresponding thereto to the determination unit 24.

When the processing of determining the pseudo target due to the electromagnetic noise is not performed, the beat frequency $F_{sb\_r}$ and the frequency $F_{n\_r}$ of the electromagnetic noise related to the true target, and the Doppler frequency $F_{sb\_v}$ and the Doppler frequency $F_{n\_v}$ corresponding to the pseudo target due to the electromagnetic noise related to the true target are not distinguished. Therefore, when the electromagnetic noise is input to the ADC 21, the pseudo target having the range value R obtained by substituting the frequency $F_{n\_r}$ of the electromagnetic noise into the beat frequency $F_{sb\_r}$ of Formula (3) and the relative speed value v obtained by substituting the Doppler frequency $F_{n\_v}$ corresponding to the pseudo target due to the electromagnetic noise into Formula (4) is output.

Next, processing of determining a pseudo target due to electromagnetic noise will be described with reference to a flowchart illustrated in FIG. 9.

In the present embodiment, radar signals of two measurement modes having different chirp slopes and having the same chirp period are periodically alternately transmitted and received, and signal processing results in the respective measurement modes are compared to determine a pseudo target due to electromagnetic noise.

Figure 10:
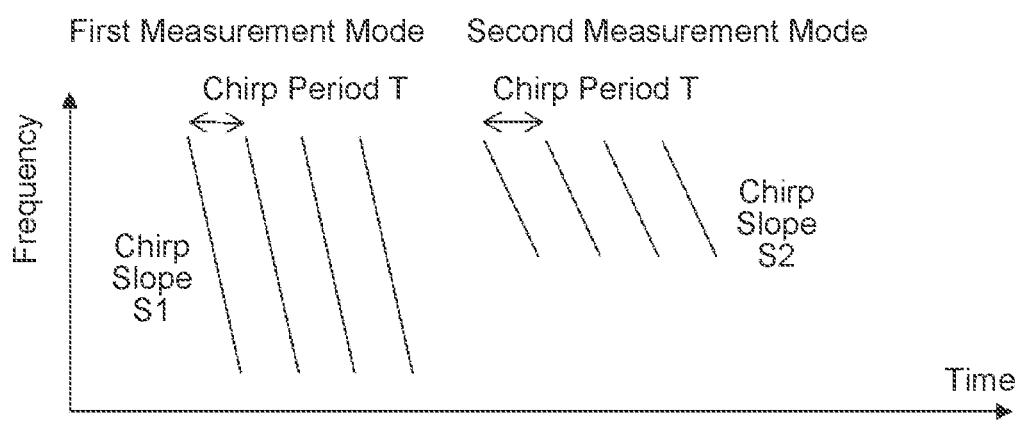
FIG. 10 is a graph illustrating radar signals used in a first measurement mode and a second measurement mode according to the first embodiment.

FIG. 10 illustrates radar signals in two measurement modes used in the present embodiment. In FIG. 10, the absolute value of the chirp slope S1 of the first measurement mode is larger than the absolute value of the chirp slope S2 of the second measurement mode, and the chirp periods of the first measurement mode and the second measurement mode have the same value T. Since the range resolution is higher as the absolute value of the chirp slope is larger, the first measurement mode is assigned for short range measurement, and the second measurement mode is assigned for long range measurement. The radar signal used in the first measurement mode is referred to as a first frequency modulation signal, and the radar signal used in the second measurement mode is referred to as a second frequency modulation signal.

Returning to FIG. 9, in step ST21, the signal processing unit 22 acquires the digital data of the beat signal in the first measurement mode from the beat signal generating unit 18.

Next, in step ST22, the range and speed calculating unit 23 performs calculation processing of range and speed information on the digital data acquired in the first measurement mode, and stores the calculation result in the memory.

When the signal processing for the first measurement mode is completed, in step ST23, the signal processing unit 22 acquires digital data of the beat signal in the second measurement mode from the beat signal generating unit 18.

Next, in ST24, the range and speed calculating unit 23 performs calculation processing of range and speed information on the digital data acquired in the second measurement mode, and stores the calculation result in the memory.

After completion of the signal processing for the second measurement mode, in step ST25, the determination unit 24 acquires the calculation results of the first measurement mode and the second measurement mode from the memory. Thereafter, the determination unit 24 compares the beat frequency and the Doppler frequency corresponding to the peak value in the two-dimensional spectrum of each measurement mode, and determines whether or not the target corresponding to each peak value is a pseudo target due to electromagnetic noise.

Specifically, in the two measurement modes, a pair of targets in which both the beat frequency and the Doppler frequency match is determined to be a pseudo target due to electromagnetic noise.

Figure 11:
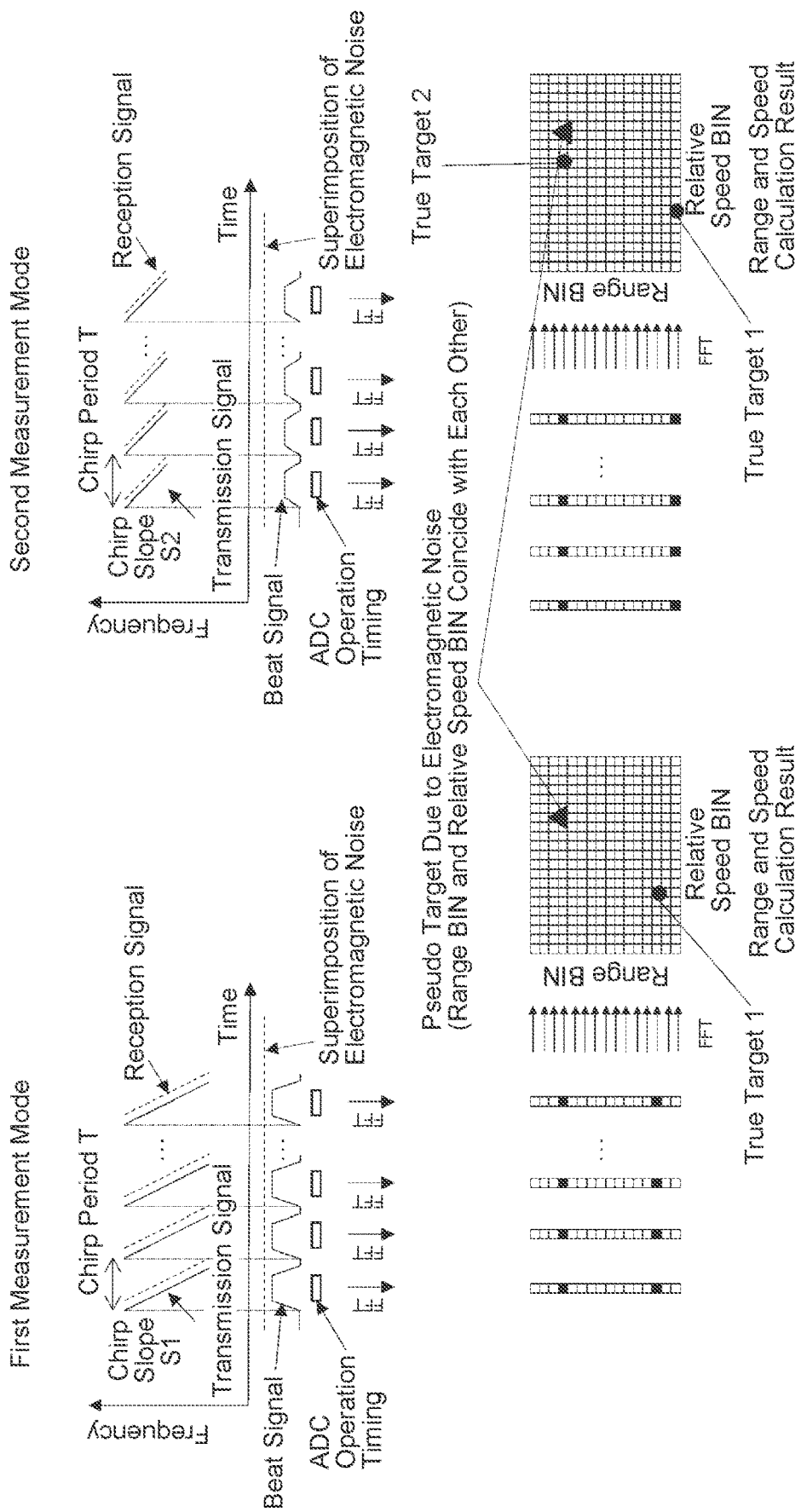
FIG. 11 is an explanatory diagram illustrating a range and speed calculation result in a case where chirp periods of a first measurement mode and a second measurement mode are the same.

FIG. 11 illustrates signal processing in an environment in which a true target 1 at a short range from the radar device 1, a true target 2 at a long range from the radar device 1, and a pseudo target due to electromagnetic noise are mixed, and a two-dimensional spectrum as a result thereof, in the present embodiment. In this drawing, the horizontal axis represents the relative speed BIN corresponding to the Doppler frequency, and the vertical axis represents the range BIN corresponding to the beat frequency.

The true target 1 is detected in both the first measurement mode and the second measurement mode because the true target 1 is present at a short range. However, since the chirp slope is different between the first measurement mode and the second measurement mode, the range BIN of the true target 1 has a different value corresponding to the product of the chirp slope of each measurement mode and the range between the radar device 1 and the target. Note that, since the true target 2 is present at a long range, the true target 2 is out of the detection range of the first measurement mode, and is observed only in the second measurement mode.

On the other hand, the pseudo target due to the electromagnetic noise has the same range BIN in both the first measurement mode and the second measurement mode because the frequency of the electromagnetic noise corresponds to the beat frequency. In addition, since the first measurement mode and the second measurement mode have the same chirp period, the Doppler frequency corresponding to the electromagnetic noise has the same value, and the relative speed BIN also has the same value in both the first measurement mode and the second measurement mode. That is, in the first measurement mode and the second measurement mode, it can be determined that the target corresponding to the peak at which both the range BIN and the relative speed BIN match is the pseudo target due to the electromagnetic noise.

Figure 12:
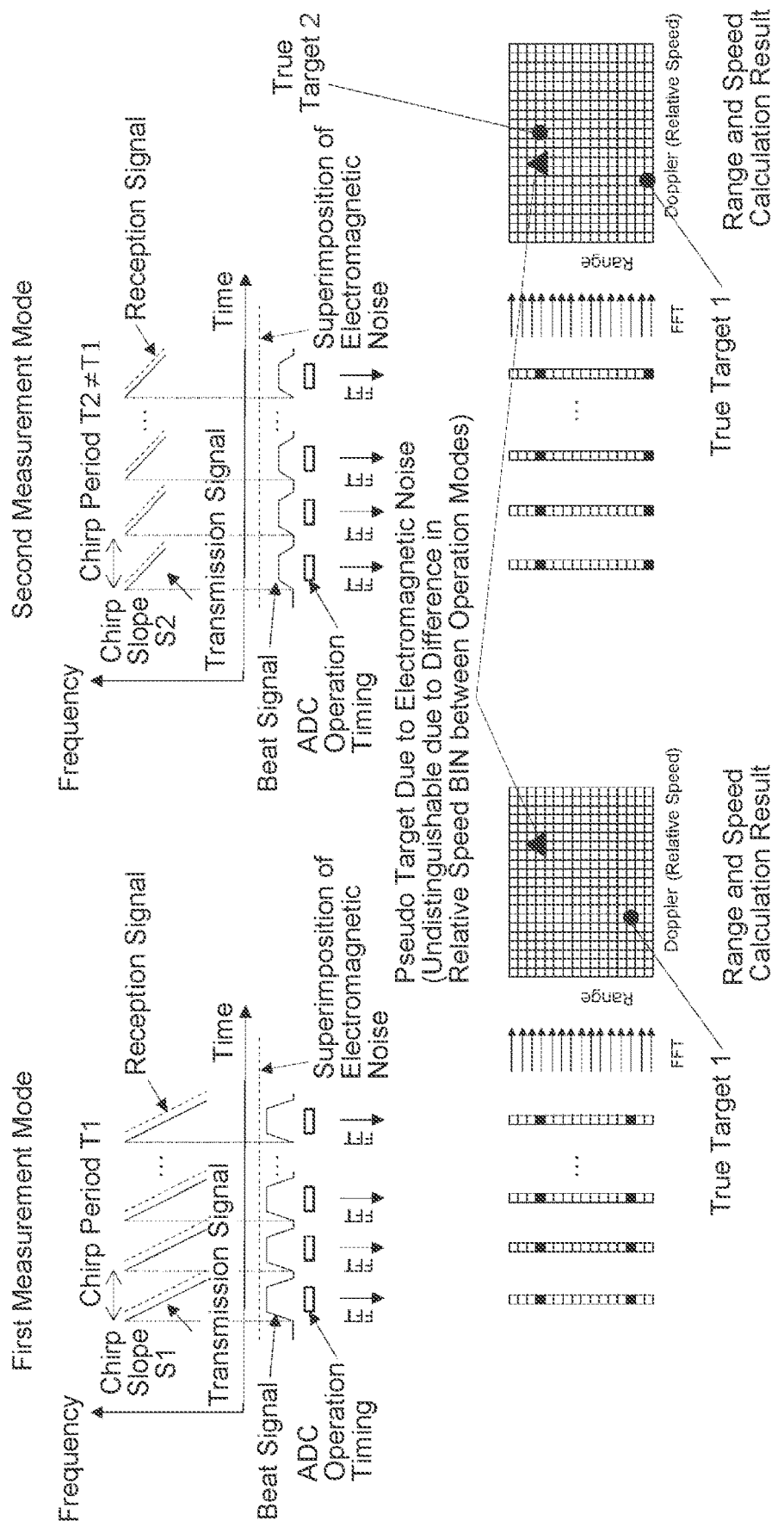
FIG. 12 is an explanatory diagram illustrating a range and speed calculation result in a case where chirp periods of the first measurement mode and the second measurement mode are different.

As a comparison, FIG. 12 illustrates a signal processing result in a case where the chirp periods of the first measurement mode and the second measurement mode are different.

In the case illustrated in FIG. 12, in the pseudo target due to the electromagnetic noise, the range BIN has the same value because the frequency of the electromagnetic noise corresponding to the beat frequency is the same, but the Doppler frequency corresponding to the electromagnetic noise has a value determined by the chirp period of each measurement mode and the electromagnetic noise frequency, and thus the values do not necessarily coincide with each other between the two measurement modes.

That is, when the frequency of the electromagnetic noise is unknown, the correspondence relationship of the Doppler frequency of the pseudo target due to the electromagnetic noise in each measurement mode is also unknown, and the determination criterion for the pseudo target due to the electromagnetic noise using the beat frequency and the Doppler frequency cannot be defined.

Further, in the case that the false detection is determined only by the coincidence of the beat frequencies, the pseudo target cannot be distinguished from the true target 2 having the same beat frequency as the electromagnetic noise, and the true target 2 may be erroneously determined as the pseudo target due to the electromagnetic noise.

Therefore, in order to determine the pseudo target due to the electromagnetic noise, it is essential to use the measurement modes having the same chirp period.

In step ST26, the determination unit 24 determines whether or not there is a pseudo target due to electromagnetic noise as a result of the processing of determining a pseudo target due to electromagnetic noise. If there is no pseudo target due to electromagnetic noise, the target detecting unit 25 generates and outputs target information using the signal processing result in the first measurement mode and the signal processing result in the second measurement mode in step ST28.

In addition, when it is determined in step ST26 that there is a pseudo target due to electromagnetic noise, information corresponding to the pseudo target due to electromagnetic noise is removed from the signal processing results in the first measurement mode and the second measurement mode in step ST27, and then the target detecting unit 25 generates and outputs target information in step ST28.

Note that, in the processing of the pseudo target due to the electromagnetic noise in step ST27, instead of removing the information corresponding to the pseudo target due to the electromagnetic noise, information that the reliability is low may be given to the target determined to be the pseudo target due to the electromagnetic noise.

Alternatively, when it is determined that there is a pseudo target due to electromagnetic noise, the target detecting unit 25 may output information notifying of the mixture of the electromagnetic noise to the outside of the radar device 1.

As described above, in the present embodiment, the radar device is configured to include the determination unit 24 that periodically alternately transmits and receives radar signals in two measurement modes having different chirp slopes and having the same chirp period, and determines a pair of targets corresponding to a peak at which a beat frequency and a Doppler frequency match in signal processing results in the respective measurement modes as a pseudo target due to electromagnetic noise.

As a result, in the FCM system radar device, there is an effect that it is possible to determine and remove a pseudo target due to electromagnetic noise only by signal processing of the radar without taking hardware measures such as electromagnetic shielding.

Second Embodiment

In the first embodiment, the radar device including the determination unit 24 that determines a pair of targets corresponding to a peak at which a beat frequency and a Doppler frequency match in signal processing results in two measurement modes as a pseudo target due to electromagnetic noise has been described.

In the present embodiment, a radar device in a case where the determination of the pseudo target due to the electromagnetic noise in the determination unit 24 is performed using information of the range and the relative speed output by the range and speed calculating unit 23 will be described.

The configuration diagram of the radar device in the present embodiment is the same as that in FIG. 1, and the method of processing the determination of the pseudo target due to the electromagnetic noise in the determination unit 24 of the signal processing unit 22 is different.

Figure 13:
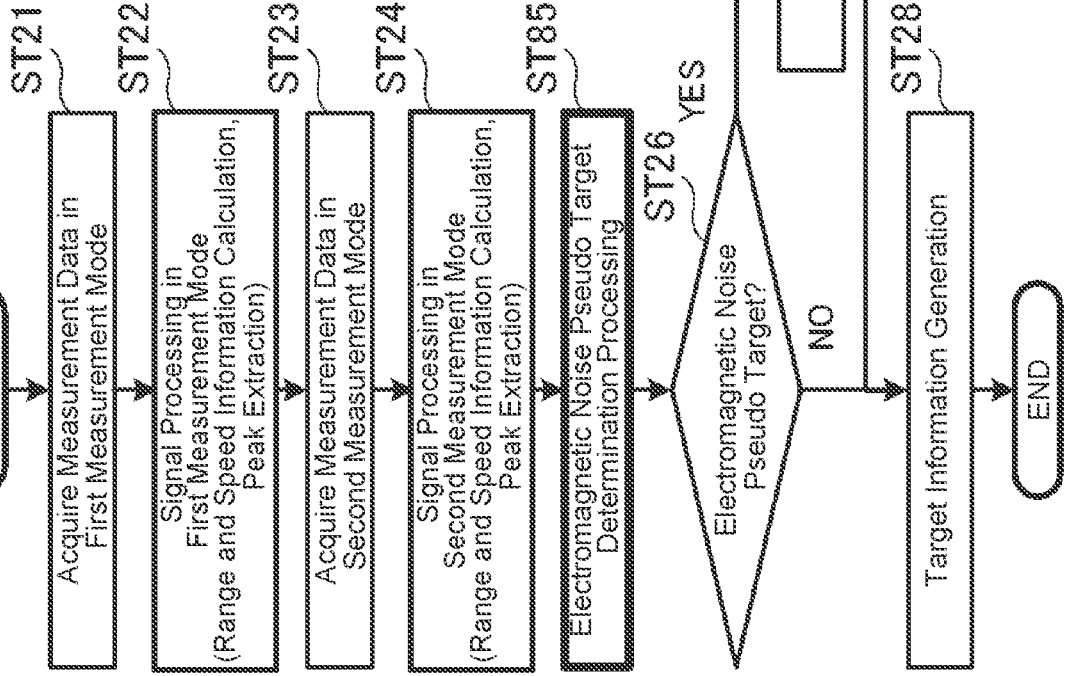
FIG. 13 is a flowchart illustrating a processing procedure of the signal processing unit 22 according to a second embodiment.

FIG. 13 is a flowchart illustrating a processing procedure of the signal processing unit 22 of the radar device in the present embodiment.

Figure 9:
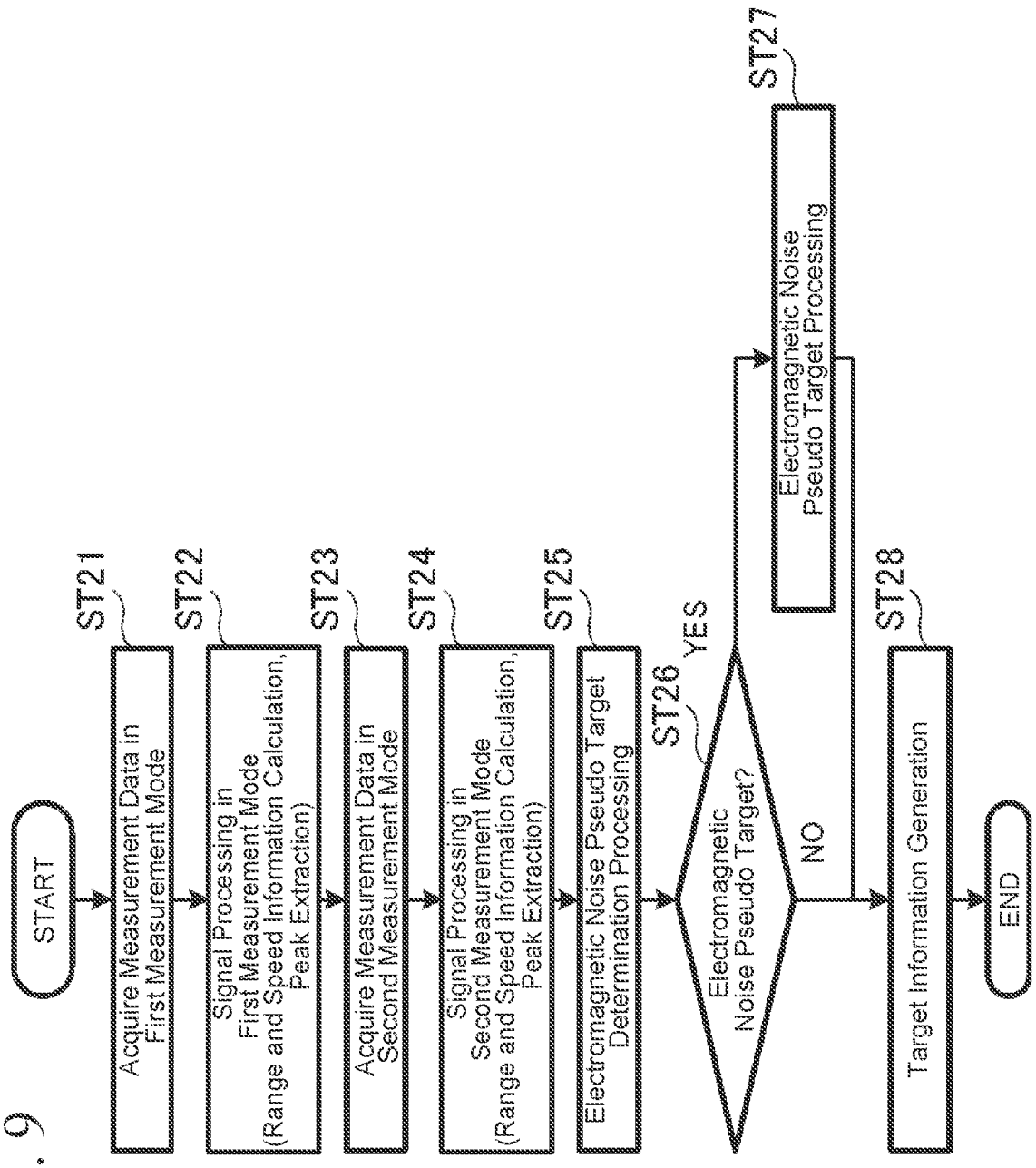
FIG. 9 is a flowchart illustrating a processing procedure of the signal processing unit 22 according to the first embodiment.

Note that in FIG. 13, the same reference numerals as those in FIG. 9 denote the same or corresponding parts, and thus description thereof is omitted.

In step ST85, after completing the signal processing for the second measurement mode, the determination unit 24 acquires the calculation results in the first measurement mode and the second measurement mode from the memory.

Thereafter, the range R and the relative speed v corresponding to the peak value in the two-dimensional spectrum in each measurement mode are compared to determine whether or not the target corresponding to each peak value is a pseudo target due to electromagnetic noise.

Specifically, in two measurement modes, targets having matching relative speed values are compared, and a pair of targets in which the range value R2 in the second measurement mode matches a value obtained by multiplying the range value R1 in the first measurement mode by the ratio (S1/S2) of the first chirp slope and the second chirp slope is determined to be a pseudo target due to electromagnetic noise.

Figure 14:
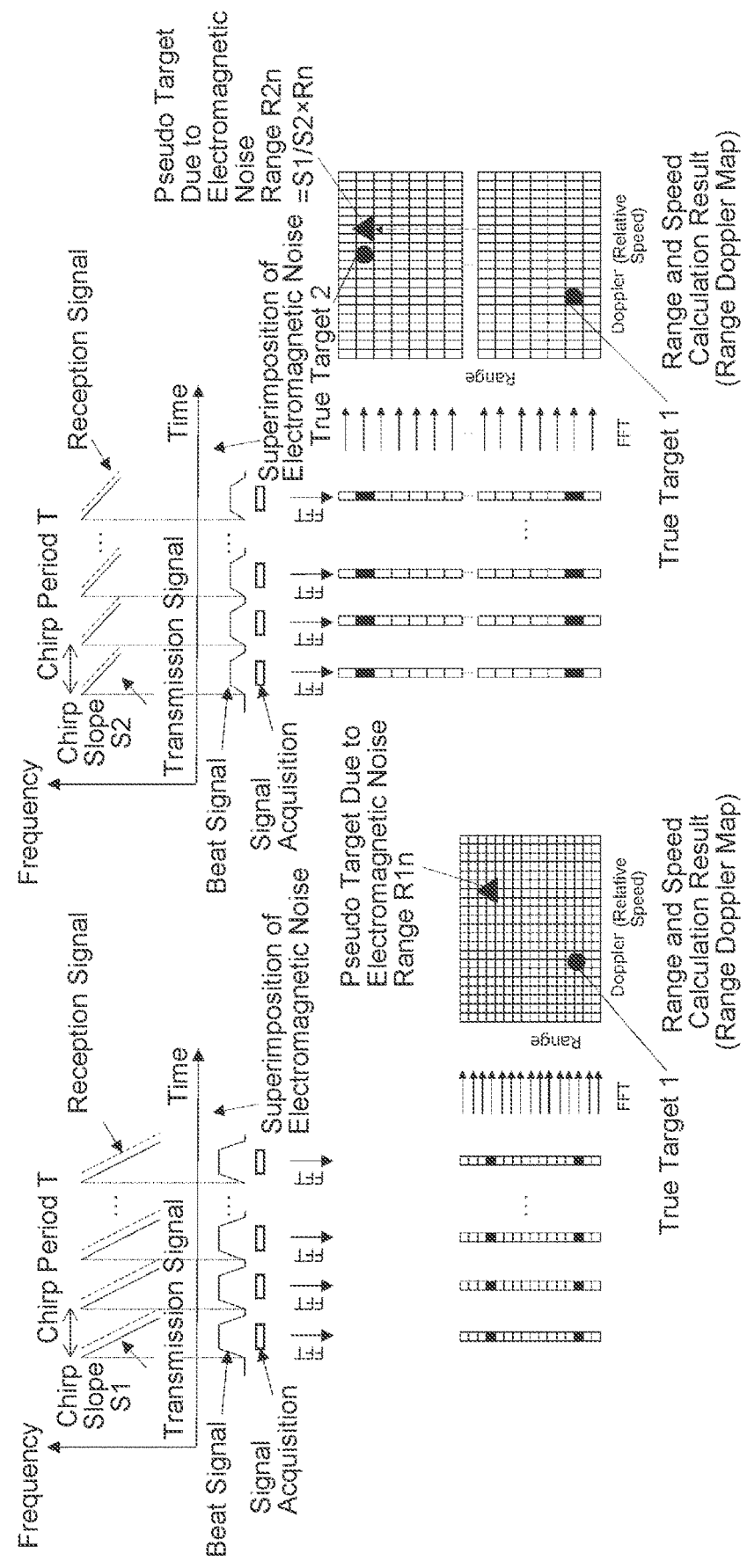
FIG. 14 is a graph illustrating radar signals used in a first measurement mode and a second measurement mode according to the second embodiment.

FIG. 14 illustrates range and speed calculation processing in each of the first measurement mode (left in FIG.) and the second measurement mode (right in FIG.) and a result thereof (range Doppler map) in an environment where a true target 1 at a short range from the radar device 1, a true target 2 at a long range from the radar device 1, and a pseudo target due to electromagnetic noise are mixed.

Since the true target 1 is present at a short range, the true target 1 is detected in both the first measurement mode and the second measurement mode, and the range value and the relative speed value of the true target 1 have the same value in both the first measurement mode and the second measurement mode. Since the true target 2 is present at a long range, the true target 2 is out of the detection range of the first measurement mode, and is observed only in the second measurement mode.

The relative speed value of the pseudo target due to the electromagnetic noise has the same chirp period in the first measurement mode and the second measurement mode, and thus the Doppler frequency corresponding to the electromagnetic noise has the same value. Therefore, both the first measurement mode and the second measurement mode have the same value.

On the other hand, since the range value of the pseudo target due to the electromagnetic noise is a value obtained by substituting the frequency $F_{n\_r}$ of the electromagnetic noise into the beat frequency $F_{sb\_r}$ of Formula (3), the range values take different values in the first measurement mode and the second measurement mode having different chirp slopes.

When the frequency $F_{n\_r}$ of the electromagnetic noise is constant, the relationship between the range value Rn1 of the pseudo target due to the electromagnetic noise in the first measurement mode and the range value Rn2 of the pseudo target due to the electromagnetic noise in the second measurement mode is expressed by the following Formula (5) using the chirp slope S1 of the first measurement mode and the chirp slope S2 of the second measurement mode.

$$Rn2 = \frac{S1}{S2} \cdot Rn1 \qquad (5)$$

Accordingly, in the first measurement mode and the second measurement mode, with respect to the target having the same relative speed value, it can be determined that a pair of targets in which the range value of the target in the second measurement mode matches a value obtained by multiplying the range value of the target in the first measurement mode by S1/S2 is a pseudo target due to electromagnetic noise.

As described above, in the present embodiment, the radar device 1 is configured to include the determination unit 24 that periodically alternately transmits and receives radar signals in two measurement modes having different chirp slopes and having the same chirp period, compares targets having matching relative speed values in signal processing results in the respective measurement modes, and determines that a pair of targets in which the range value in the second measurement mode matches a value obtained by multiplying the range value in the first measurement mode by the ratio (S1/S2) of the first chirp slope and the second chirp slope is a pseudo target due to electromagnetic noise.

As a result, there is an effect that the pseudo target due to the electromagnetic noise can be determined using only the calculation results of the range and the relative speed in each measurement mode.

Third Embodiment

In the second embodiment, the case of having the first measurement mode and the second measurement mode has been described. However, in the present embodiment, a radar device will be described in which a third measurement mode is further added to prevent erroneous determination in a case where a different true target accidentally has a relationship between a range and a relative speed that satisfy a determination condition of a pseudo target due to electromagnetic noise.

Note that signal processing in each measurement mode is the same as that in the first and second embodiments, and thus description thereof is omitted.

Figure 15:
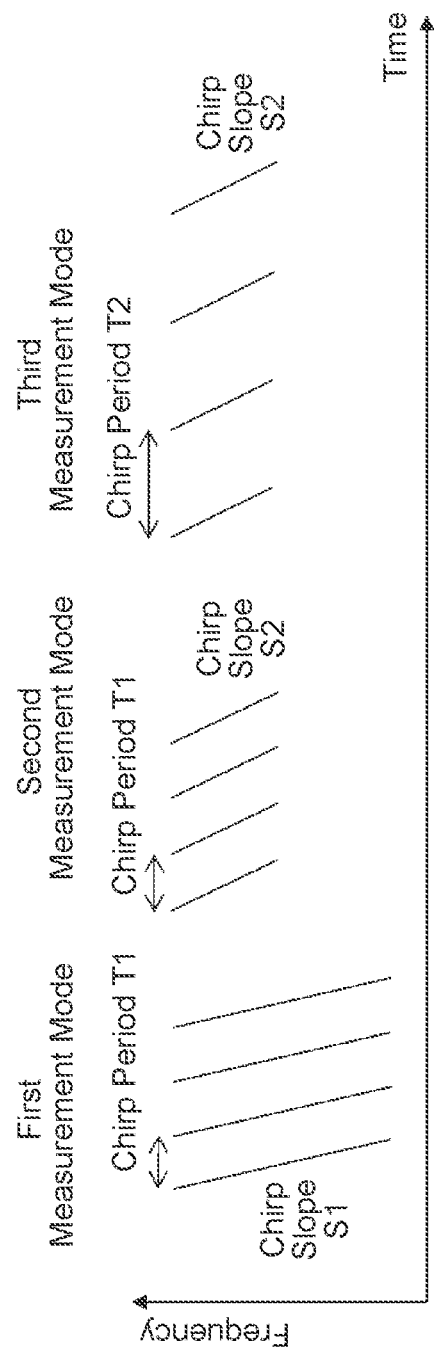
FIG. 15 is a graph illustrating radar signals used in a first measurement mode, a second measurement mode, and a third measurement mode according to a third embodiment.

FIG. 15 is a radar signal in each measurement mode according to the present embodiment. In the present embodiment, radar signals in three measurement modes are periodically and repeatedly transmitted.

The relationship between the first measurement mode and the second measurement mode is the same as that in the first and second embodiments. In the first measurement mode, the chirp slope is S1 and the chirp period is T1. In the second measurement mode, the chirp slope is S2 different from that in the first measurement mode, and the chirp period is T1 identical to that in the first measurement mode.

In the third measurement mode, the chirp slope is set to S2 that is the same as that in the second measurement mode, and the chirp period is set to T2 that is different from those in the first and second measurement modes. The radar signal used in the third measurement mode is referred to as a third frequency modulation signal.

Next, processing of determining a pseudo target due to electromagnetic noise in the signal processing unit 22 according to the present embodiment will be described.

Figure 16:
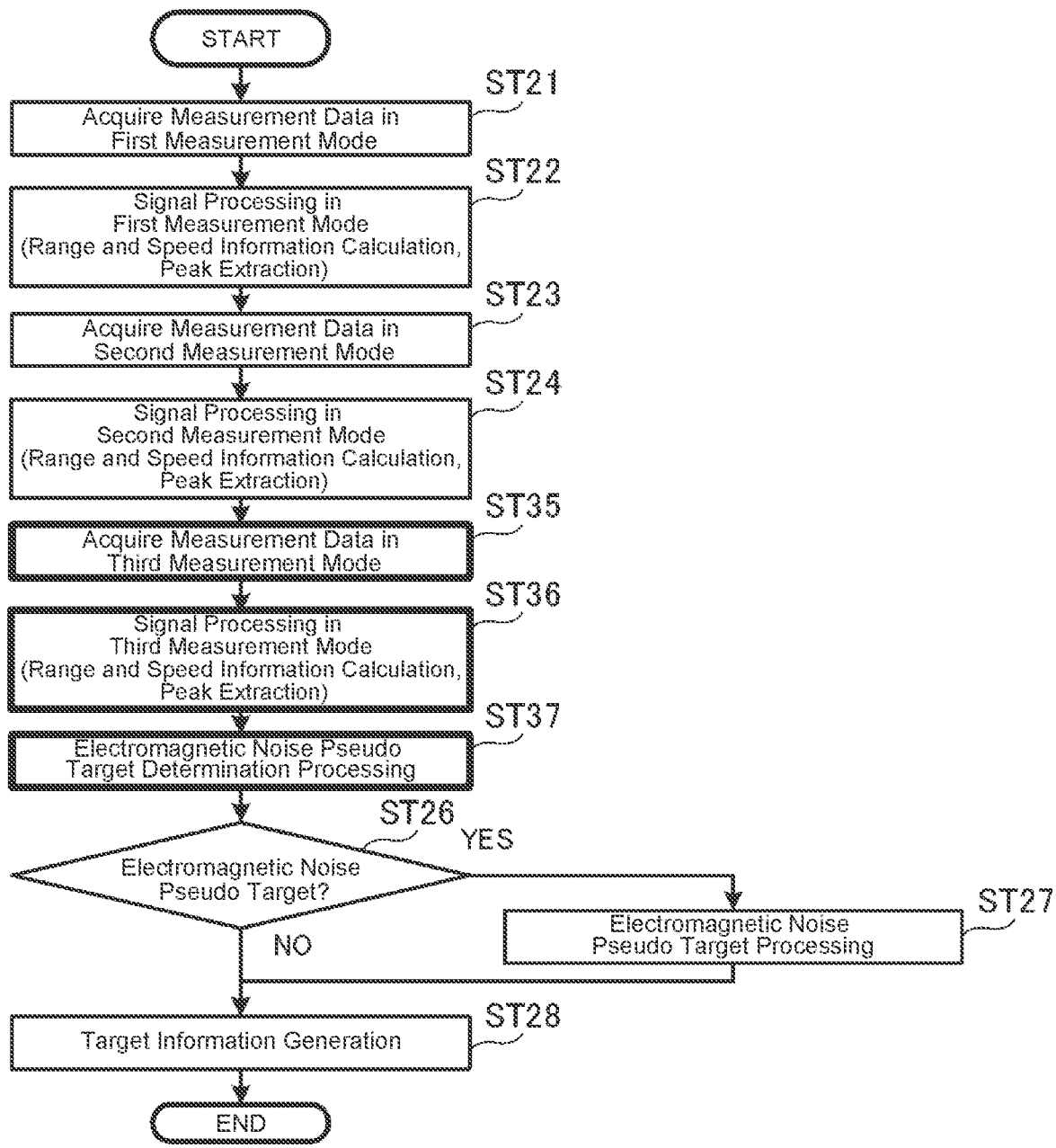
FIG. 16 is a flowchart illustrating a processing procedure of a signal processing unit 22 according to the third embodiment.

FIG. 16 is a flowchart illustrating a processing procedure of the signal processing unit 22 of the radar device in the present embodiment. Note that, in FIG. 16, the same reference numerals as those in FIG. 13 denote the same or corresponding parts, and thus description thereof is omitted.

In step ST35, the signal processing unit 22 acquires the digital data of the beat signal in the third measurement mode from the beat signal generating unit 18.

In step ST36, the range and speed calculating unit 23 performs calculation processing of range and speed information on the digital data acquired in the third measurement mode, and stores the calculation result in the memory.

In step ST37, after completing the signal processing for the third measurement mode, the determination unit 24 acquires the calculation results of the first measurement mode, the second measurement mode, and the third measurement mode from the memory.

Thereafter, the determination unit 24 compares the range R and the relative speed v corresponding to the peak value in the two-dimensional spectrum of each measurement mode, and determines whether or not the target corresponding to each peak value is a pseudo target due to electromagnetic noise.

The processing in step ST37 performed by the determination unit 24 will be described in detail.

Figure 17:
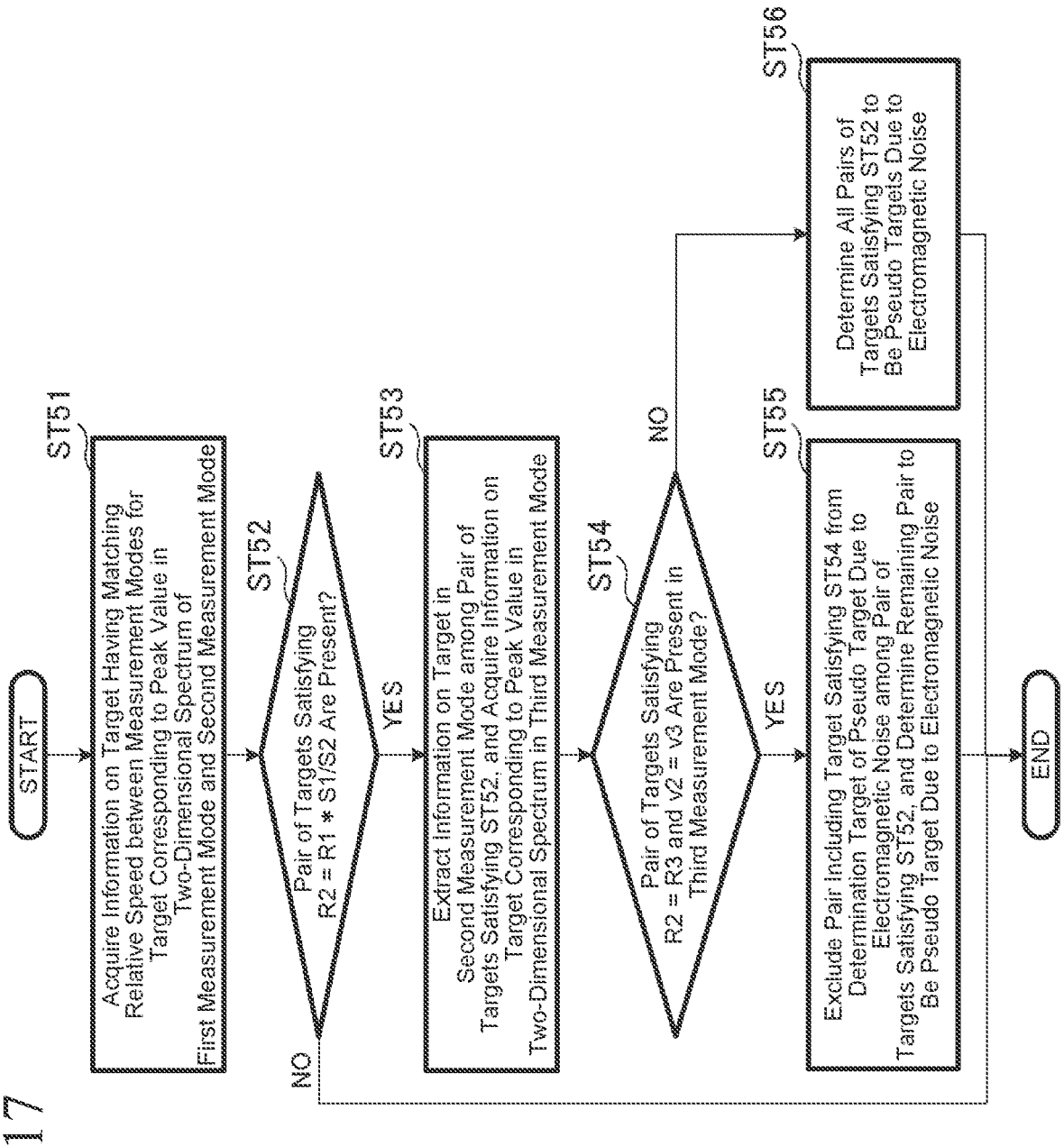
FIG. 17 is a flowchart of processing for determining a pseudo target due to electromagnetic noise according to the third embodiment.

FIG. 17 is a flowchart of processing of determining a pseudo target due to electromagnetic noise, which is performed in step ST37.

A method for extracting a pseudo target due to electromagnetic noise is the same as that in the second embodiment.

In step ST51, information on a target having a matching relative speed value is acquired in two measurement modes (a first measurement mode and a second measurement mode).

In step ST52, it is determined whether there is a pair of targets in which the range value R2 in the second measurement mode matches a value obtained by multiplying the range value R1 in the first measurement mode by the ratio (S1/S2) of the first chirp slope and the second chirp slope.

In a case where it is determined that all the targets are not pseudo targets due to electromagnetic noise, the processing of step ST37 ends, and the processing proceeds to step ST26 of FIG. 16.

On the other hand, in step ST53, in a case where there is a pair of targets satisfying the condition of step ST52, the target in the second measurement mode is extracted from the pair of targets, and information on the target corresponding to the peak value in the two-dimensional spectrum in the third measurement mode is acquired.

Next, in step ST54, for the information on the target corresponding to the peak value in the two-dimensional spectrum in the third measurement mode acquired in step ST53, whether or not the range value and the relative speed value match between the target in the second measurement mode and the target in the third measurement mode that satisfy the condition of step ST52 is compared.

That is, for the range R2 and the relative speed v2 of the target in the second measurement mode, and the range R3 and the relative speed v3 of the target in the third measurement mode, it is determined whether or not there is a target satisfying R2=R3 and v2=v3 in the signal processing result of the third measurement mode.

In step ST55, when a target satisfying the condition of ST54 is present in the third measurement mode, a pair including a target satisfying the condition of ST54 is excluded from a determination target of a pseudo target due to electromagnet noise among pairs of targets determined as pseudo targets due to electromagnetic noise in step ST52, and the remaining pairs are determined as pseudo targets due to electromagnetic noise.

In step ST56, when there is no target satisfying the condition of ST54, it is determined that all the pairs of targets satisfying the condition of ST52 are pseudo targets due to electromagnetic noise, and the processing ends.

Figure 18:
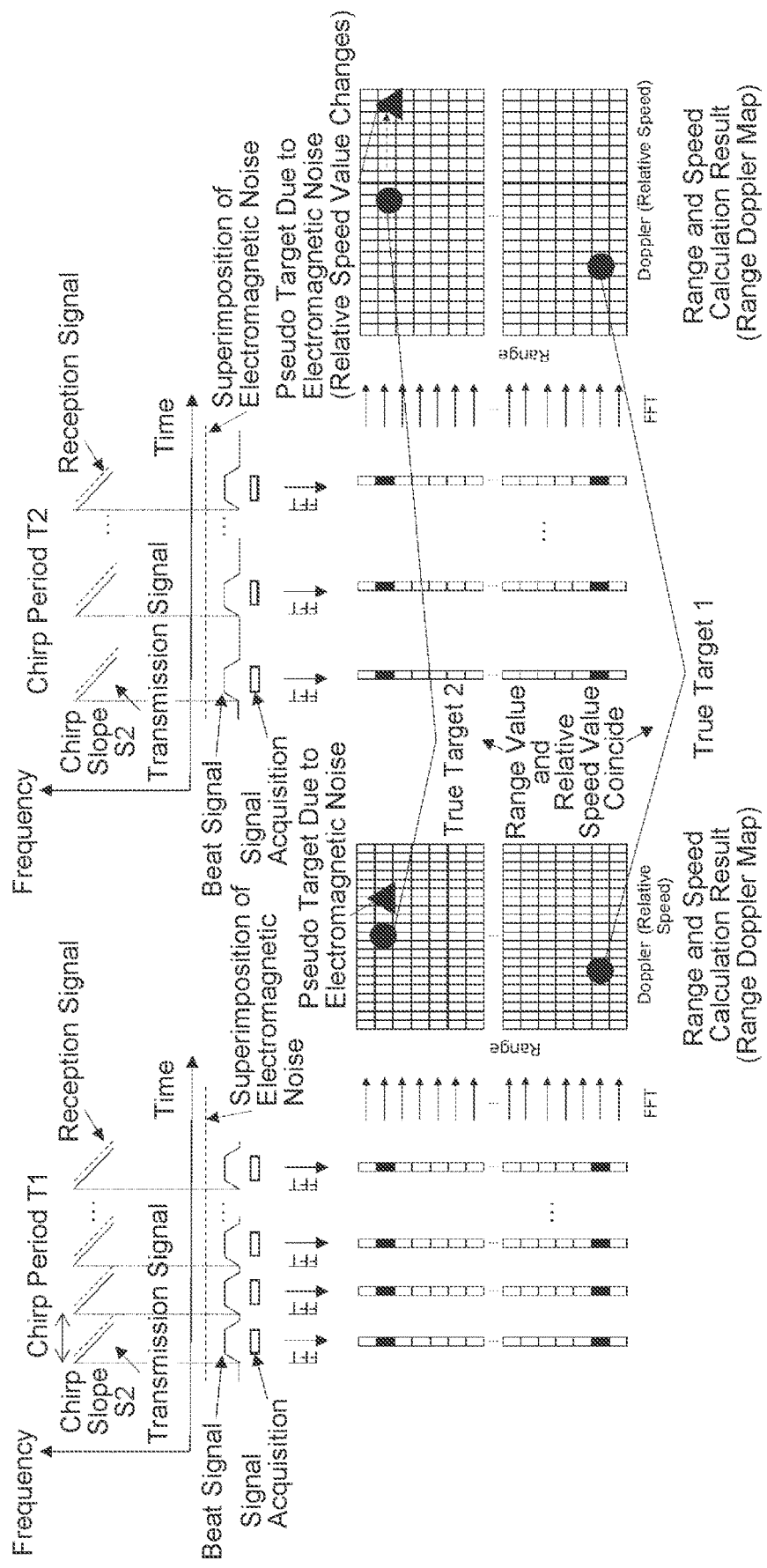
FIG. 18 is an explanatory diagram illustrating range and speed calculation processing in each of a second measurement mode and a third measurement mode according to the third embodiment.

FIG. 18 illustrates range and speed calculation processing and a result (range Doppler map) of each of the second measurement mode (left side in FIG. 18) and the third measurement mode (right side in FIG. 18) in an environment where a true target 1 at a short range from the radar device 1, a true target 2 at a long range from the radar device 1, and a pseudo target due to electromagnetic noise are mixed.

In both the second measurement mode and the third measurement mode, a true target 1, a true target 2, and a pseudo target due to electromagnetic noise are detected.

In the true target, the range value and the relative speed value coincide with each other between the measurement modes. On the other hand, in the pseudo target due to electromagnetic noise, only the chirp period is different between the second measurement mode and the third measurement mode. Therefore, the Doppler frequency is integrated to different values, and only the relative speed value is different between the measurement modes. Therefore, in a case where for the pseudo target due to electromagnetic noise determined in ST52, by excluding the target corresponding to the target in which both the range value and the relative speed value coincide in the second measurement mode and the third measurement mode from the determination target of the pseudo target due to electromagnetic noise, a different true target accidentally satisfies the determination condition of the pseudo target due to the electromagnetic noise, it is possible to prevent the pseudo target due to the electromagnetic noise from being erroneously determined.

As described above, in the present embodiment, the third measurement mode having the same chirp slope as the second measurement mode and having a different chirp period is added to the second embodiment.

Then, the radar device 1 is configured to include the determination unit 24 that extracts the target in the second measurement mode from the pair of pseudo targets due to electromagnetic noise determined by the signal processing results of the first measurement mode and the second measurement mode, and excludes a pair of targets in the first measurement mode and the second measurement mode including the target from the determination target of the pseudo target due to electromagnetic noise when the target in which both the range value and the relative speed value coincide with each other is present in the third measurement mode.

As a result, in the first measurement mode and the second measurement mode, when a different true target accidentally has a relationship between a range and a relative speed that satisfy a determination condition for a pseudo target due to electromagnetic noise, it is possible to prevent the true target from being erroneously determined to be a pseudo target due to electromagnetic noise.

Fourth Embodiment

In the third embodiment, the radar device has been described in which the third measurement mode is added to the first measurement mode and the second measurement mode to prevent erroneous determination in a case where a different true target accidentally has a relationship between a range and a relative speed that satisfy a determination condition of a pseudo target due to electromagnetic noise.

In the present fourth embodiment, a radar device will be described in which a fourth measurement mode is further added to prevent erroneous determination in a case where a true target and a pseudo target due to electromagnetic noise overlap.

In the third embodiment, there remains a case where erroneous determination is made when a true target and a pseudo target due to electromagnetic noise overlap, and the fourth embodiment solves this problem.

Note that signal processing in each measurement mode is the same as that in the first and second embodiments, and thus description thereof is omitted.

Figure 19:
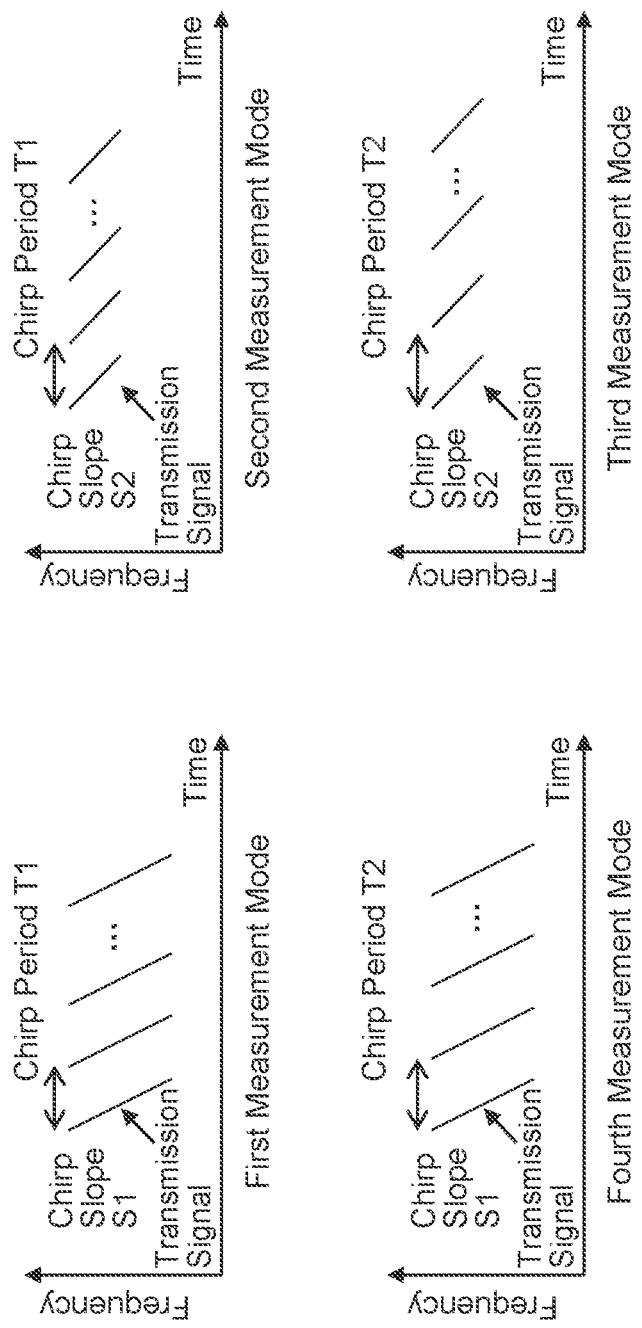
FIG. 19 is a graph illustrating radar signals used in a first measurement mode, a second measurement mode, a third measurement mode, and a fourth measurement mode in a radar device according to a fourth embodiment.

FIG. 19 is a graph illustrating radar signals used in the first measurement mode, the second measurement mode, the third measurement mode, and the fourth measurement mode in the radar device according to the fourth embodiment. In the fourth embodiment, radar signals in four measurement modes are periodically and repeatedly transmitted.

The relationship between the first measurement mode and the second measurement mode is the same as those in the first and second embodiments. In the first measurement mode, the chirp slope is S1 and the chirp period is T1. In the second measurement mode, the chirp slope is S2 different from that in the first measurement mode, and the chirp period is T1 identical to that in the first measurement mode.

The third measurement mode is the same as that in the third embodiment, the chirp slope is S2 identical to that in the second measurement mode, and the chirp period is T2 different from those in the first and second measurement modes.

In the fourth measurement mode, the chirp slope is S1 identical to that in the first measurement mode, and the chirp period is T2 identical to that in the third measurement mode. The radar signal used in the fourth measurement mode is referred to as a fourth frequency modulation signal.

Next, processing of determining a pseudo target due to electromagnetic noise in the signal processing unit according to the present embodiment will be described.

Figure 20:
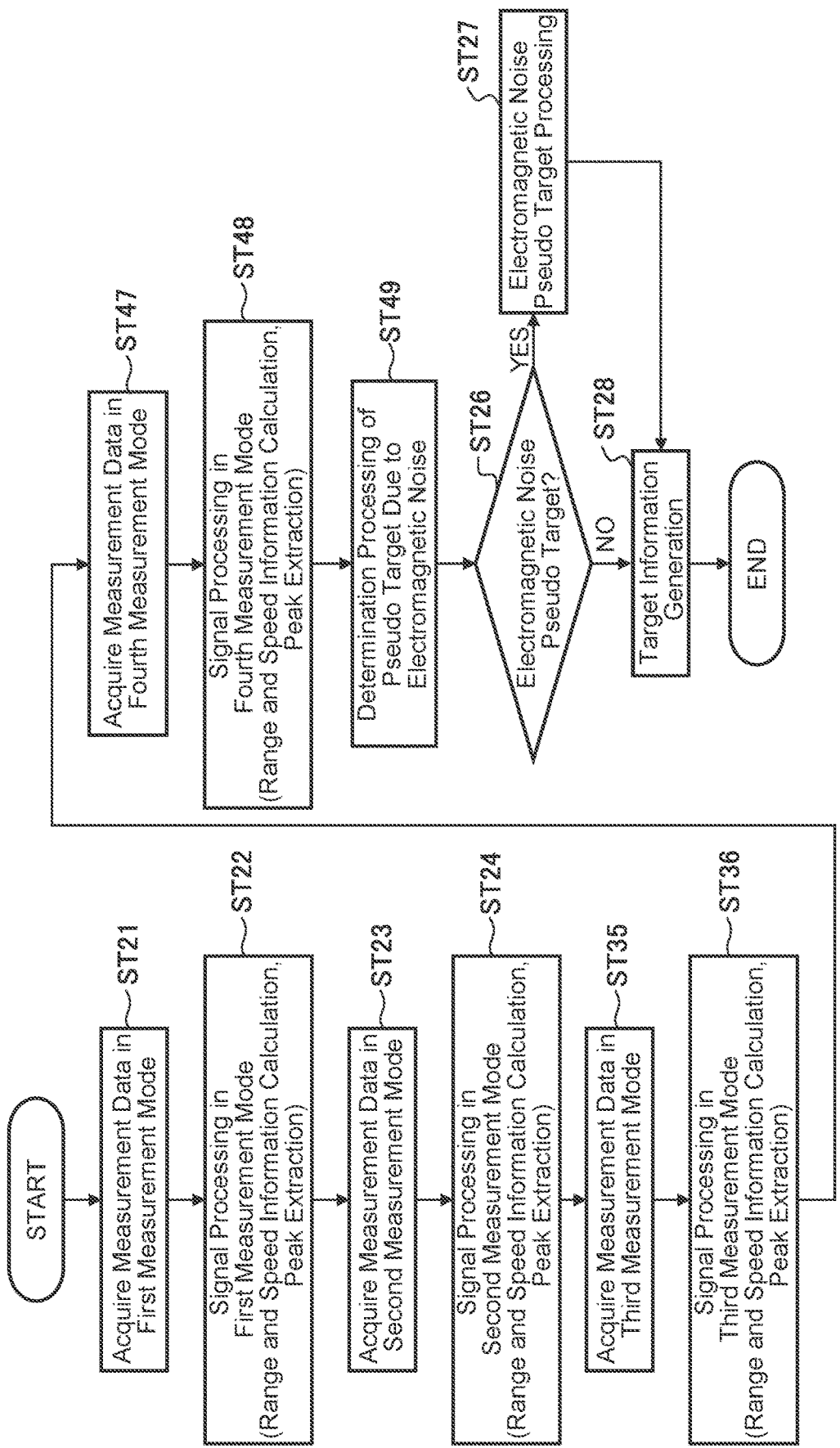
FIG. 20 is a flowchart illustrating a processing procedure of a signal processing unit 22 according to the fourth embodiment.

FIG. 20 is a flowchart illustrating a processing procedure of the signal processing unit 22 of the radar device in the present embodiment. Note that, in FIG. 20, the same reference numerals as those in FIG. 16 denote the same or corresponding parts, and thus description thereof is omitted.

In step ST47, the signal processing unit 22 acquires the digital data of the beat signal in the fourth measurement mode from the beat signal generating unit 18.

In step ST48, the range and speed calculating unit 23 performs calculation processing of range and speed information on the digital data acquired in the fourth measurement mode, and stores the calculation result in the memory.

In step ST49, after completing the signal processing for the fourth measurement mode, the determination unit 24 acquires calculation results of the first measurement mode, the second measurement mode, the third measurement mode, and the fourth measurement mode from the memory.

Thereafter, the determination unit 24 compares the range R and the relative speed v corresponding to the peak value in the two-dimensional spectrum of each measurement mode, and determines whether or not the target corresponding to each peak value is a pseudo target due to electromagnetic noise.

The processing in step ST49 performed by the determination unit 24 will be described in detail.

Figure 21:
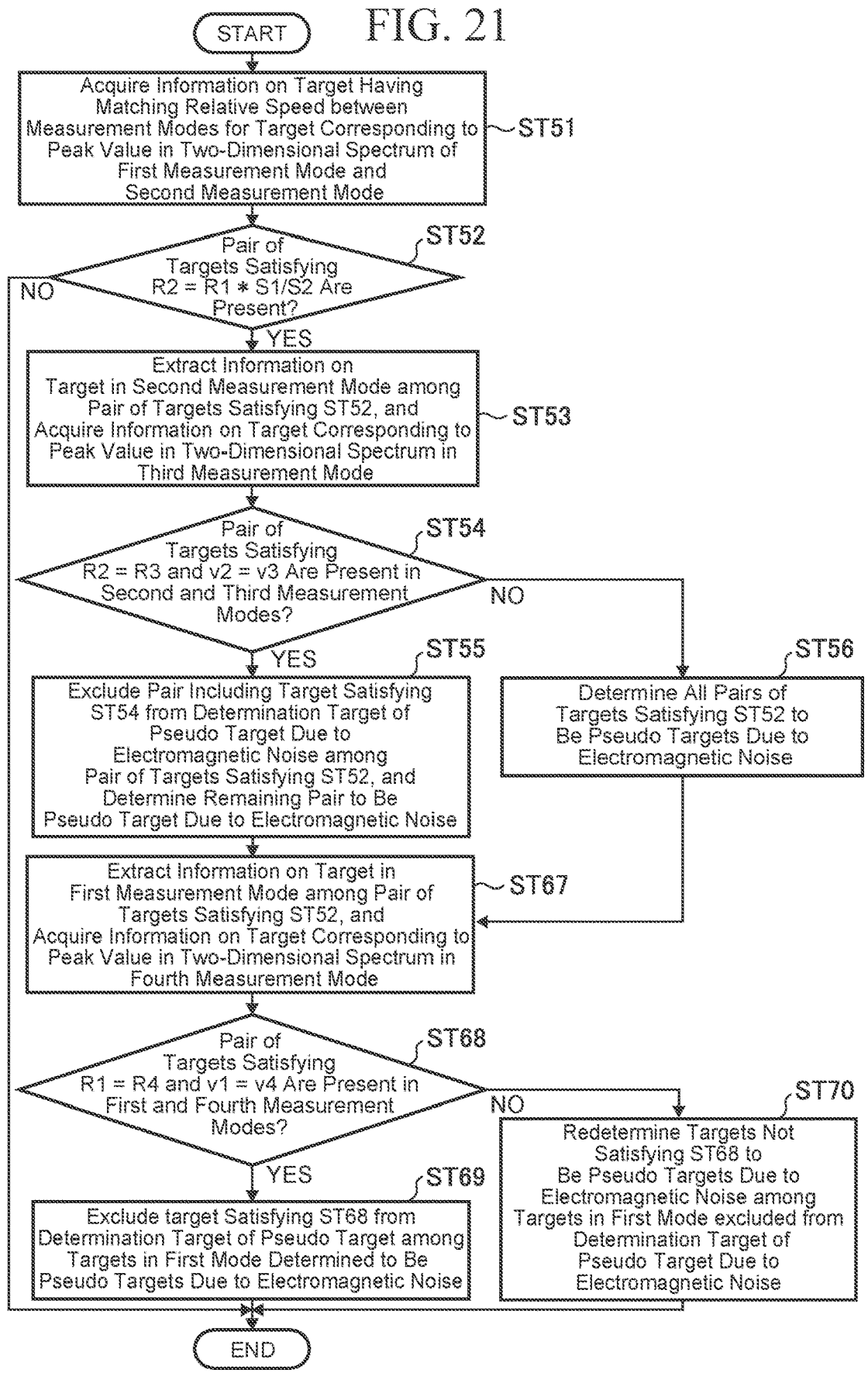
FIG. 21 is a flowchart of processing for determining a pseudo target due to electromagnetic noise according to the fourth embodiment.

FIG. 21 is a flowchart of processing of determining a pseudo target due to electromagnetic noise, which is performed in step ST49. A method for extracting a pseudo target due to electromagnetic noise is the same as that in the second embodiment. Note that in FIG. 21, the same reference numerals as those in FIG. 17 denote the same or corresponding parts, so that the description thereof is omitted.

In step ST67, information on the pseudo target determined in step ST55 or step ST56 and the target excluded from the determination target of the pseudo target is received. Further, information on the target in the first measurement mode is extracted from the pair of targets satisfying step ST52, and information on the target corresponding to the peak value in the two-dimensional spectrum in the fourth measurement mode is acquired.

Next, in step ST68, for the information on the target corresponding to the peak value in the two-dimensional spectrum in the fourth measurement mode acquired in step ST67, whether or not the range value and the relative speed value match between the target in the first measurement mode and the target in the fourth measurement mode satisfying step ST52 is compared.

That is, with respect to the range R1 and the relative speed v1 of the target in the first measurement mode, and the range R4 and the relative speed v4 of the target in the fourth measurement mode, it is determined whether a target satisfying R1=R4 and v1=v4 is present in the signal processing result in the fourth measurement mode.

In step ST69, when the target satisfying the condition in step ST68 is present in the fourth measurement mode, the target satisfying step ST68 is excluded from the determination target of the pseudo target among the targets in the first measurement mode determined as the pseudo targets due to electromagnetic noise in step ST55 or step ST56, and the processing ends.

In step ST70, when the target satisfying the condition in step ST68 is not present in the fourth measurement mode, a target that does not satisfy the condition in step ST68 is redetermined as a pseudo target due to electromagnetic noise among the targets in the first measurement mode excluded from determination targets of pseudo targets due to electromagnetic noise in step ST55, and the processing ends.

Figure 22:
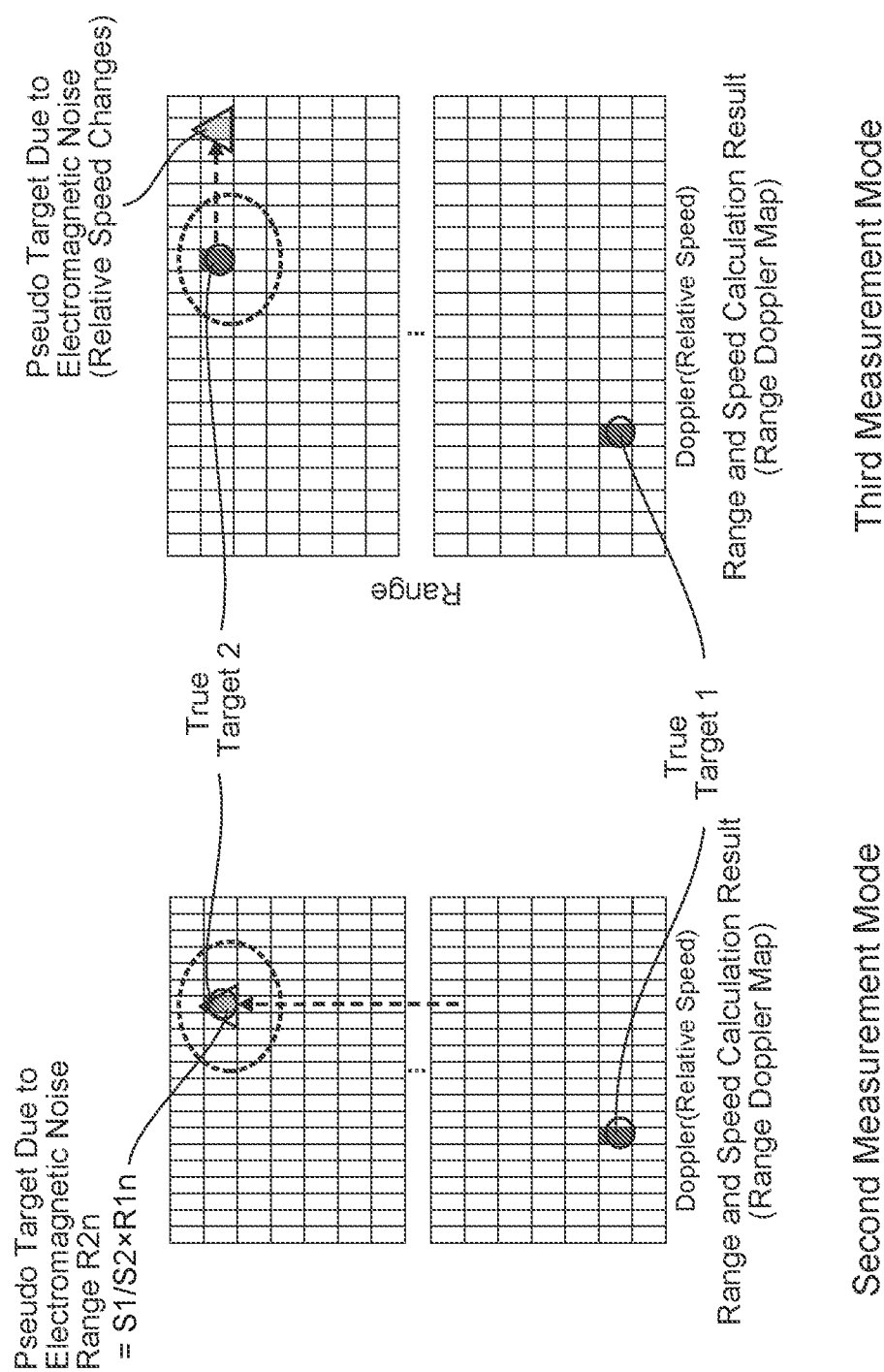
FIG. 22 is an explanatory diagram illustrating range and speed calculation processing in each of the second measurement mode and the third measurement mode according to the fourth embodiment.

FIG. 22 illustrates a range and speed calculation result (range Doppler map) in the second measurement mode (left side in FIG. 22) and the third measurement mode (right side in FIG. 22) in an environment where a true target 1 at a short range from the radar device 1, a true target 2 at a long range from the radar device 1, and a pseudo target due to electromagnetic noise are mixed.

In both the second measurement mode and the third measurement mode, a true target 1 indicated by a circle, a true target 2 indicated by a circle, and a pseudo target due to electromagnetic noise indicated by a triangle are detected in the range Doppler map. In addition, in the second measurement mode, the true target 2 and the pseudo target due to the electromagnetic noise overlap with each other.

In the true target, both the range value and the relative speed value coincide between the measurement modes. On the other hand, in the pseudo target due to electromagnetic noise, only the chirp period is different between the second measurement mode and the third measurement mode. Therefore, the Doppler frequency is integrated to different values, and only the relative speed value is different between the measurement modes. Therefore, the relative speed values of the true target 2 and the pseudo target due to electromagnetic noise that overlap in the second measurement mode are different from each other in the third measurement mode.

In this case, since the condition in step ST54 is satisfied due to the presence of the true target 2, a pair of the target in the second measurement mode in which the true target 2 and the pseudo target due to the electromagnetic noise overlap each other and the target in the first measurement mode (the pseudo target due to electromagnetic noise) that is paired with the true target 2, the pair satisfying step ST52, are excluded from the determination target of the pseudo target due to the electromagnetic noise in step ST55.

Figure 23:
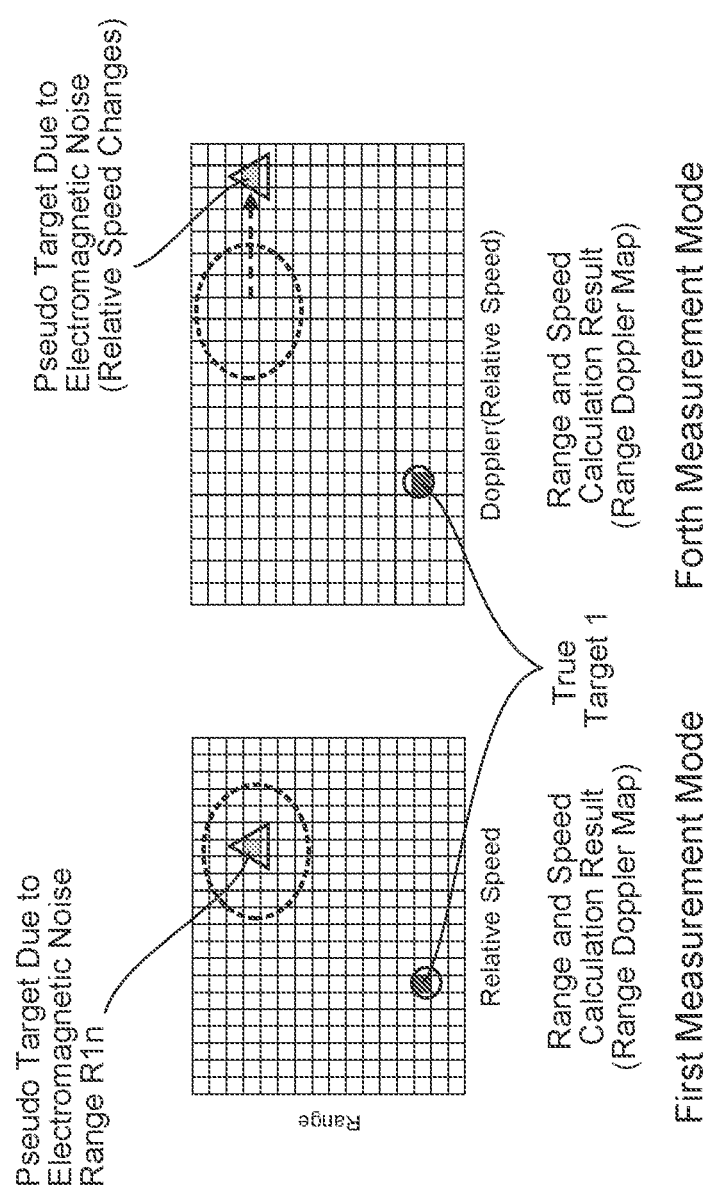
FIG. 23 is an explanatory diagram illustrating range and speed calculation processing in each of the first measurement mode and the fourth measurement mode according to the fourth embodiment.

FIG. 23 illustrates a range and speed calculation result (range Doppler map) in the first measurement mode (left side in FIG. 23) and the fourth measurement mode (right side in FIG. 23) in the same environment as in FIG. 22. In both the first measurement mode and the fourth measurement mode, a true target 1 indicated by a circle and a pseudo target due to electromagnetic noise indicated by a triangle are detected. In the first measurement mode and the fourth measurement mode, the range of the detectable range of the target is small, so that the true target 2 at a long range is not detected.

The pseudo target due to electromagnetic noise in the first measurement mode is paired with the pseudo target due to electromagnetic noise in the second measurement mode in FIG. 22, and is excluded from the determination target of the pseudo target due to electromagnetic noise by the processing of step ST55. In the configuration of the third embodiment that ends in the processing up to step ST55, under the condition in FIGS. 22 and 23, that is, under the condition that the true target and the pseudo target due to electromagnetic noise overlap in the second measurement mode, the pseudo target due to electromagnetic noise detected in the first measurement mode is erroneously determined as the true target.

Therefore, in the fourth embodiment, it is redetermined whether there is a target erroneously determined in the first measurement mode in the steps after step ST67. In the true target, the range value and the relative speed value coincide between the measurement modes. On the other hand, in the pseudo target due to electromagnetic noise, only the chirp period is different between the first measurement mode and the fourth measurement mode. Therefore, the Doppler frequency is integrated to different values, and only the relative speed value is different between the measurement modes. Therefore, even when the pseudo target due to the electromagnetic noise is erroneously determined as the true target with respect to the target in the first measurement mode in step ST55 or step ST56 due to the overlap between the true target and the pseudo target due to the electromagnetic noise in the first measurement mode or the second measurement mode, a correct determination result can be obtained by redetermining whether or not a target in which both the range value and relative speed value coincide with those of the target in the first measurement mode is present in the fourth measurement mode.

As described above, in the fourth embodiment, the fourth measurement mode having the same chirp slope as the first measurement mode and the same chirp period as the third measurement mode is added to the third embodiment. Then, the radar device 1 according to the fourth embodiment includes the determination unit 24 that, in a case where a target in which both a range value and a relative speed value coincide with each other is not present in the fourth measurement mode among targets determined to be pseudo targets due to electromagnetic noise in the signal processing results of the second measurement mode and the third measurement mode, excludes the target in the first measurement mode from determination targets of pseudo targets due to electromagnetic noise, and in a case where a target in which both a range value and a relative speed value coincide with each other is not present in the fourth measurement mode among targets in the first measurement mode excluded from the determination targets of pseudo targets due to electromagnetic noise, redetermines the target in the first measurement mode as a pseudo target due to electromagnetic noise. Accordingly, when the true target and the pseudo target due to the electromagnetic noise overlap with each other, it is possible to prevent the pseudo target due to the electromagnetic noise from being erroneously determined as the true target.

Fifth Embodiment

In the fourth embodiment, the radar device has been described in which the fourth measurement mode is further added to the first measurement mode, the second measurement mode, and the third measurement mode, and the step of performing redetermination using the detection results of the first measurement mode and the fourth measurement mode is added, thereby preventing erroneous determination in a case where a true target and a pseudo target due to electromagnetic noise overlap.

In the present embodiment, a radar device that prevents erroneous determination when a true target and a pseudo target due to electromagnetic noise overlap using detection results of a first measurement mode, a second measurement mode, a third measurement mode, and a fourth measurement mode without repeatedly performing redetermination will be described.

Note that the signal processing in each measurement mode and the radar signal in each measurement mode are the same as those in the fourth embodiment, and thus description thereof is omitted.

The determination processing of a pseudo target due to electromagnetic noise of the signal processing unit 22 in the fifth embodiment will be described.

Figure 24:
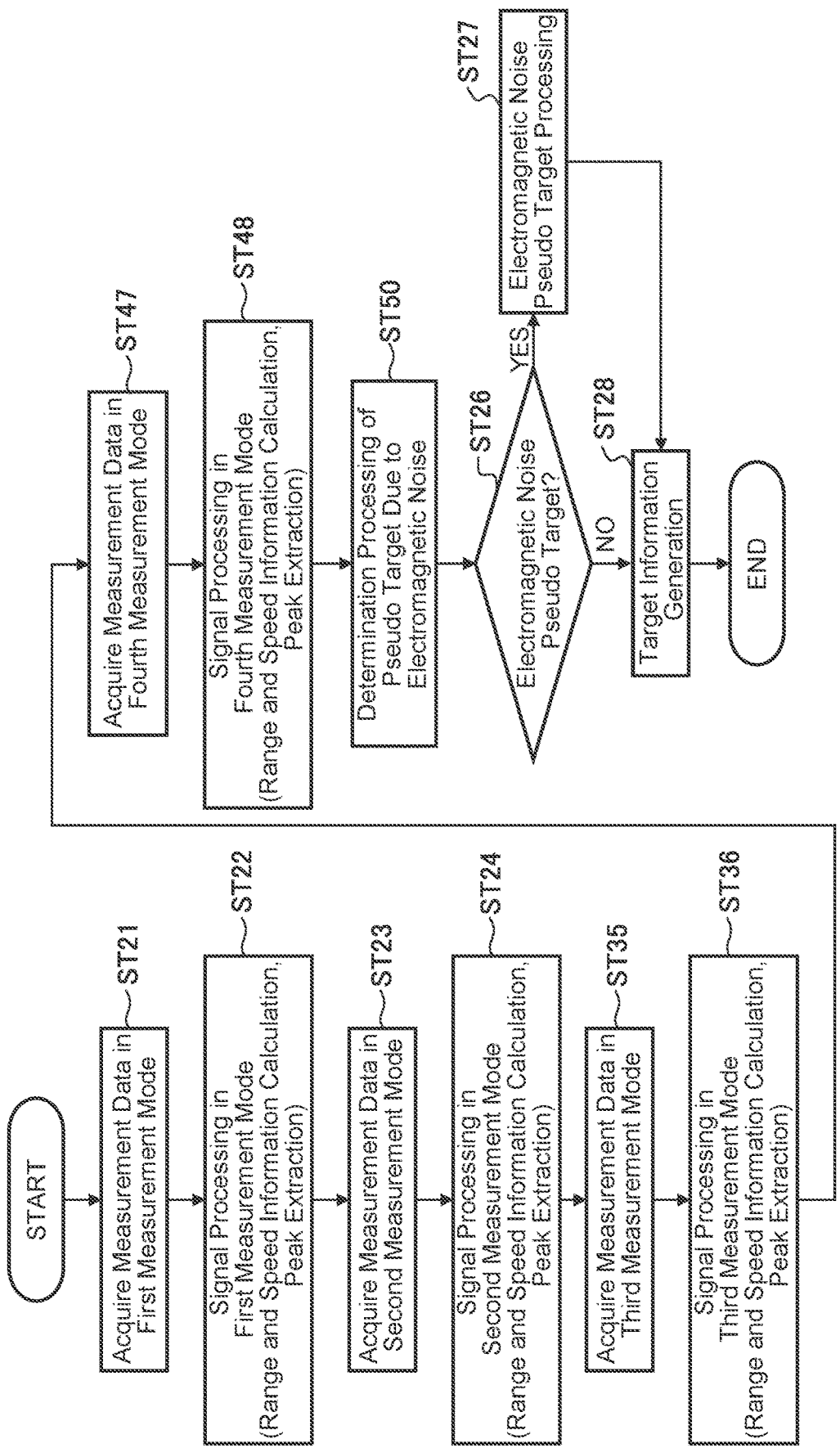
FIG. 24 is a flowchart illustrating a processing procedure of a signal processing unit 22 according to a fifth embodiment.

FIG. 24 is a flowchart illustrating a processing procedure of the signal processing unit 22 of the radar device in the fifth embodiment. Only the determination processing of a pseudo target due to electromagnetic noise in step ST50 is different from that in FIG. 20. In FIG. 24, the same reference numerals as those in FIG. 20 denote the same or corresponding parts, and thus description thereof is omitted.

The processing in step ST50 performed by the determination unit 24 will be described in detail.

Figure 25:
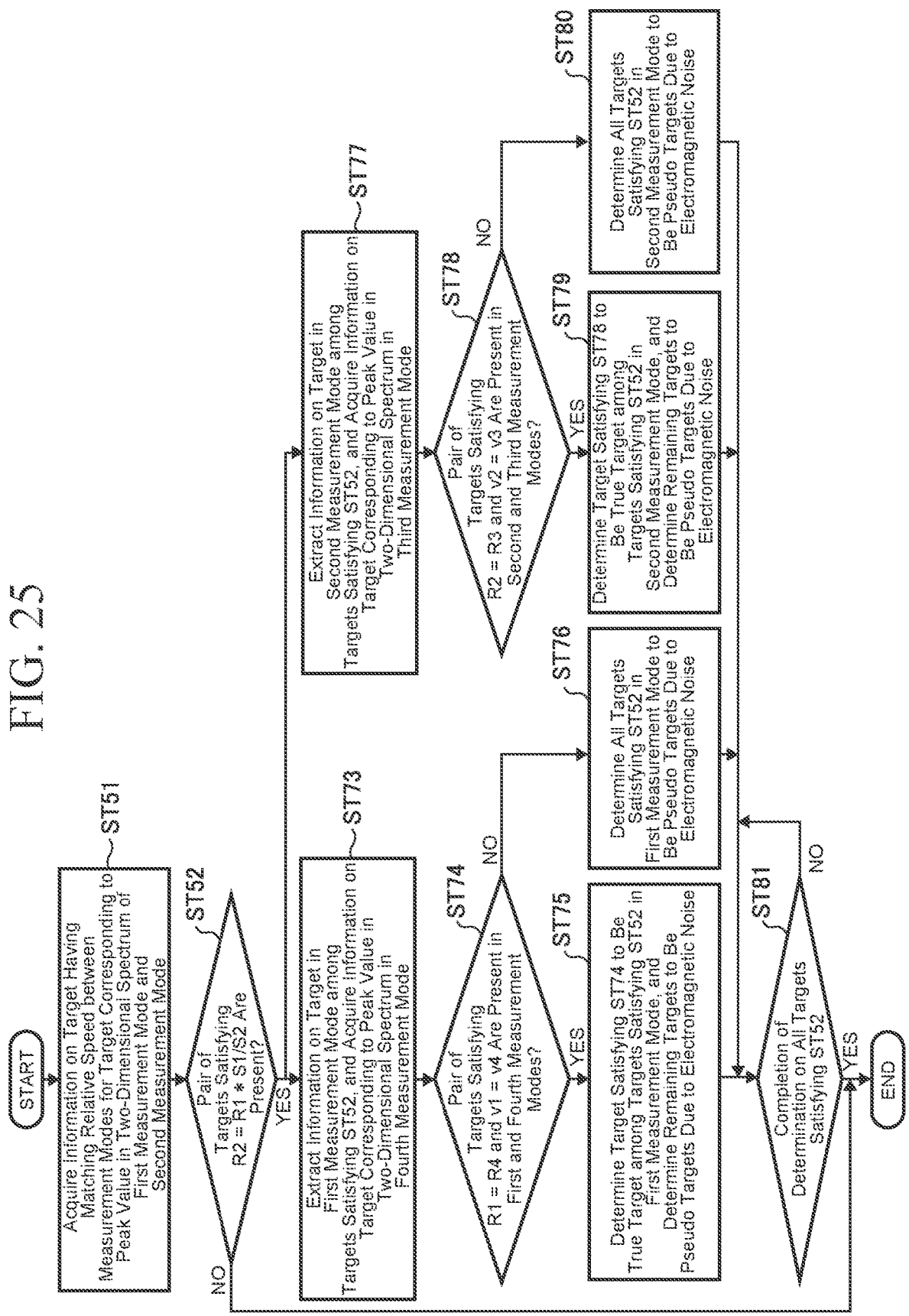
FIG. 25 is a flowchart of processing for determining a pseudo target due to electromagnetic noise according to the fifth embodiment.

FIG. 25 is a flowchart of processing of determining a pseudo target due to electromagnetic noise, which is performed in step ST50 in FIG. 24. In FIG. 25, the same reference numerals as those in FIG. 21 denote the same or corresponding parts, and thus description thereof is omitted. When there is a pair of targets satisfying the condition in step ST52, the pair is divided into the target in the first measurement mode and the target in the second measurement mode and processed in parallel.

First, a determination flow for a target in the first measurement mode that satisfies the conditions in step ST52 will be described.

In step ST73, the target in the first measurement mode is extracted from the pair of targets satisfying the condition in step ST52, and information on the target corresponding to the peak value in the two-dimensional spectrum in the fourth measurement mode is acquired.

Next, in step ST74, for the information on the target corresponding to the peak value in the two-dimensional spectrum in the fourth measurement mode acquired in step ST73, whether or not the range value and the relative speed value coincide between the target in the first measurement mode and the target in the fourth measurement mode that satisfy the condition in step ST52 is compared.

That is, with respect to the range R1 and the relative speed v1 of the target in the first measurement mode, and the range R4 and the relative speed v4 of the target in the fourth measurement mode, it is determined whether a target satisfying R1=R4 and v1=v4 is present in the signal processing result in the fourth measurement mode.

In step ST75, when a target satisfying the condition in step ST74 is present in the fourth measurement mode, the target satisfying the condition in step ST74 is excluded from the determination target of the pseudo target due to electromagnetic noise among the targets in the first measurement mode determined to be the pseudo target due to electromagnetic noise in step ST52, and the remaining targets are determined to be the pseudo target due to electromagnetic noise.

In step ST76, when there is no target satisfying the condition in step ST74, it is determined that all targets in the first measurement mode satisfying the condition in step ST52 are pseudo targets due to electromagnetic noise.

Next, a flow of determination for a target in the second measurement mode that satisfies the condition in step ST52 will be described.

In step ST77, the target in the second measurement mode is extracted from the pair of targets satisfying the condition in step ST52, and information on the target corresponding to the peak value in the two-dimensional spectrum in the third measurement mode is acquired.

Next, in step ST78, for the information on the target corresponding to the peak value in the two-dimensional spectrum in the fourth measurement mode acquired in step ST77, whether or not the range value and the relative speed value coincide between the target in the second measurement mode and the target in the third measurement mode that satisfy the condition in step ST52 is compared.

That is, for the range R2 and the relative speed v2 of the target in the second measurement mode and the range R3 and the relative speed v3 of the target in the third measurement mode, it is determined whether there is a target satisfying R2=R3 and v2=v3 in the signal processing result of the third measurement mode.

In step ST79, when a target satisfying the condition in step ST78 is present in the third measurement mode, the target satisfying the condition in step ST78 is excluded from the determination target of the pseudo target due to electromagnetic noise among the targets in the second measurement mode determined to be the pseudo target due to electromagnetic noise in step ST52, and the remaining targets are determined to be the pseudo targets due to electromagnetic noise.

In step ST80, when there is no target satisfying the condition in step ST78, it is determined that all targets in the second measurement mode satisfying the condition in step ST52 are pseudo targets due to electromagnetic noise.

In step ST81, it is confirmed whether determination as to whether or not all targets in the first measurement mode and the second measurement mode that satisfy step ST52 are pseudo targets due to electromagnetic noise has been completed, and when it is confirmed that the determination has been completed, the processing ends.

As described above, in the fifth embodiment, similarly to the fourth embodiment, the fourth measurement mode having the same chirp slope as the first measurement mode and the same chirp period as the third measurement mode is added. Then, the radar device 1 according to the fifth embodiment includes the determination unit 24 that extracts the target in the first measurement mode from the pair of pseudo targets due to the electromagnetic noise determined using the signal processing results of the first measurement mode and the second measurement mode, excludes the target in the first measurement mode from the determination target of the pseudo target due to the electromagnetic noise when the target in which both the range value and the relative speed value coincide is present in the fourth measurement mode, extracts the target in the second measurement mode from the pair of pseudo targets due to the electromagnetic noise determined using the signal processing results of the first measurement mode and the second measurement mode, and excludes the target in the second measurement mode from the determination target of the pseudo target due to the electromagnetic noise when the target in which both the range value and the relative speed value coincide exists in the third measurement mode.

As a result, similarly to the fourth embodiment, when the true target and the pseudo target due to the electromagnetic noise overlap with each other, it is possible to prevent the pseudo target due to the electromagnetic noise from being erroneously determined as the true target. In addition, since the pseudo target due to the electromagnetic noise in the first measurement mode and the pseudo target due to the electromagnetic noise in the second measurement mode are determined to be true or false by processing independent from each other, repetition of redetermination can be suppressed, and determination processing can be parallelized.

Figure 26:
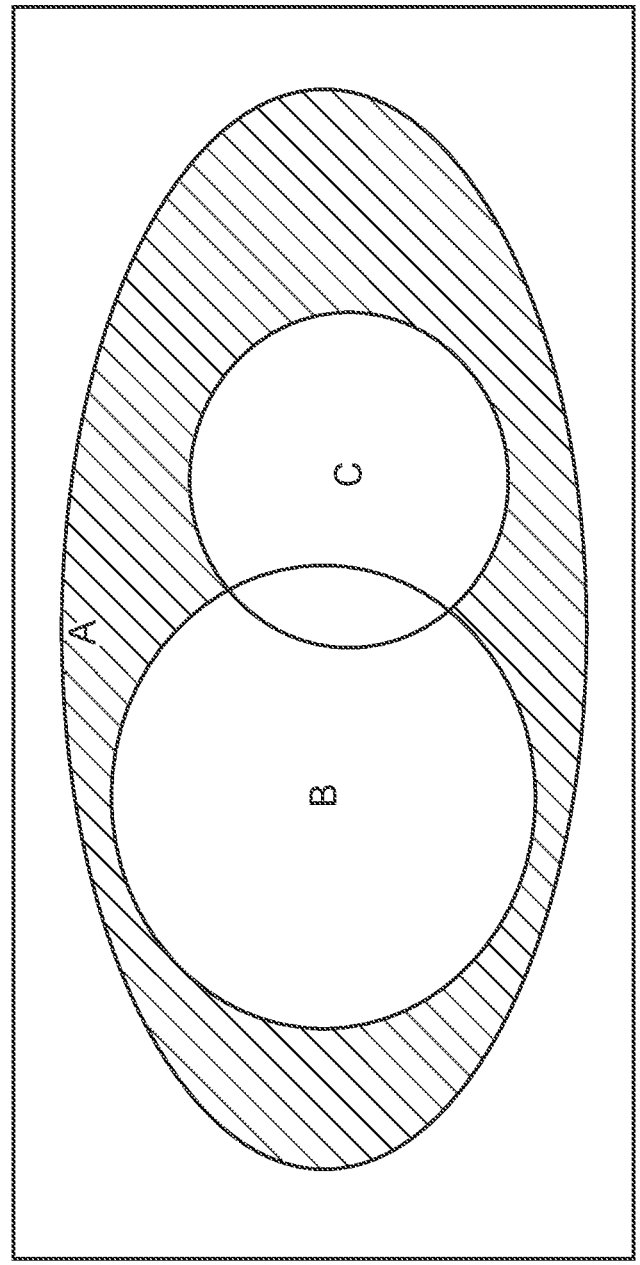
FIG. 26 is a Venn diagram illustrating conditions under which a pseudo target can be correctly determined in the first embodiment and the second embodiment.
Figure 27:
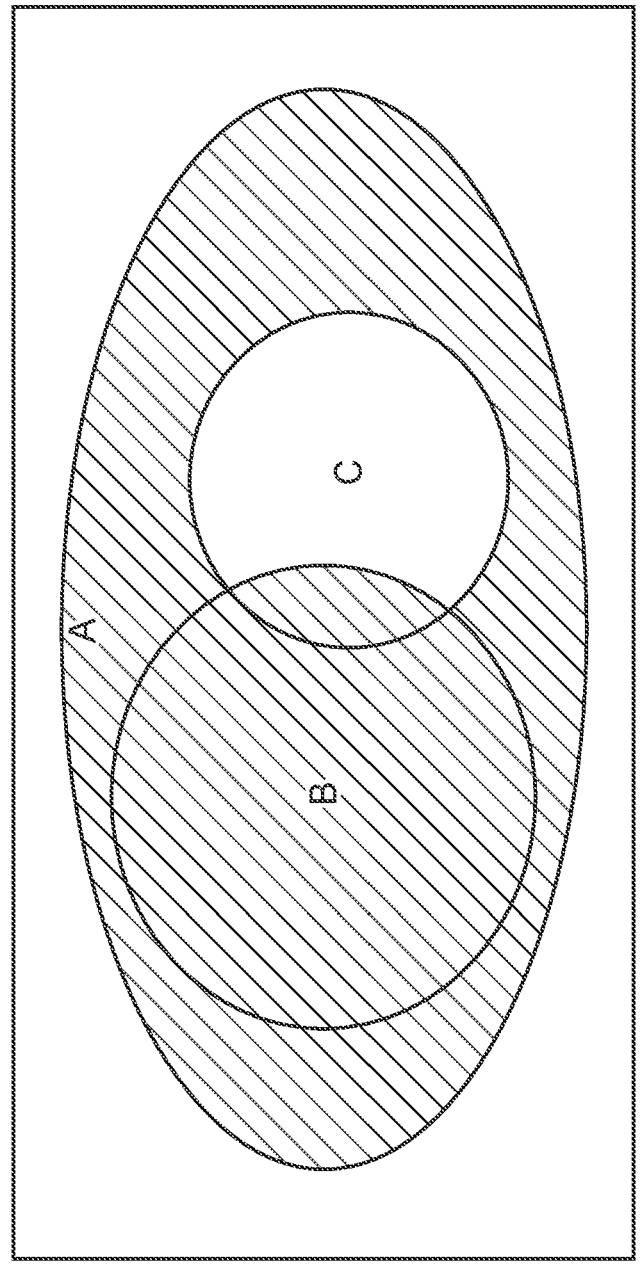
FIG. 27 is a Venn diagram illustrating conditions under which a pseudo target can be correctly determined in the third embodiment.
Figure 28:
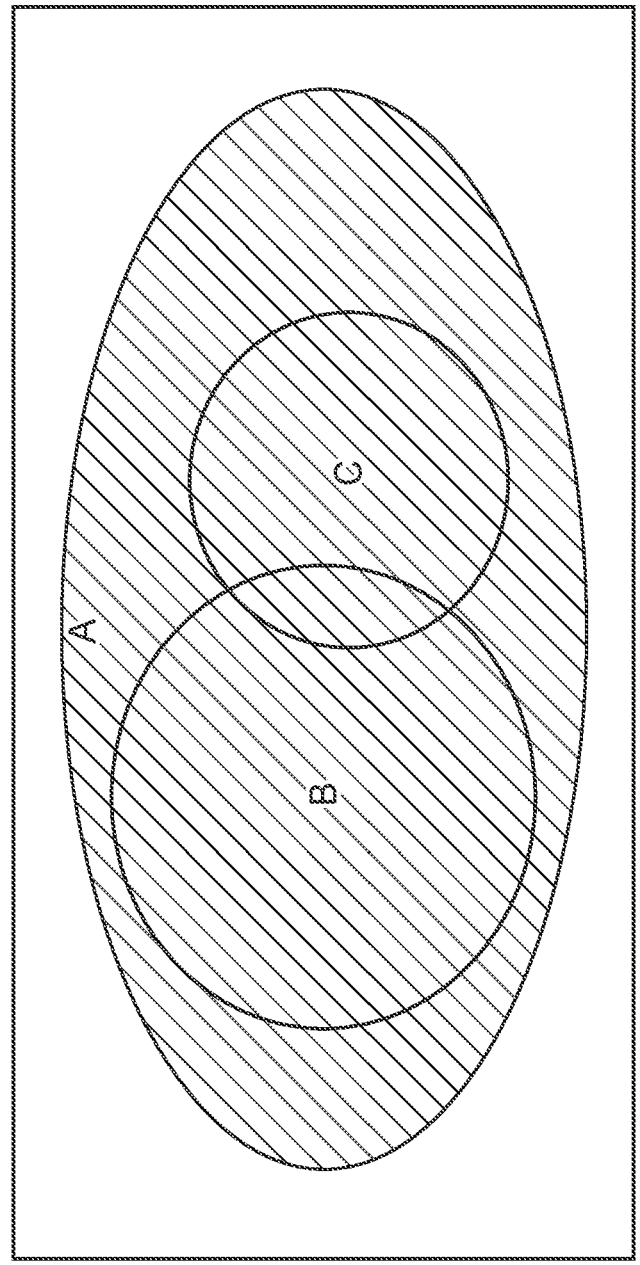
FIG. 28 is a Venn diagram illustrating conditions under which a pseudo target can be correctly determined in the fourth embodiment and the fifth embodiment.

Finally, conditions that can be correctly determined in each embodiment will be described. FIGS. 26 to 28 are Venn diagrams illustrating conditions that can be correctly determined in each embodiment. In each drawing, a hatched shaded region represents a condition that can be correctly determined.

FIG. 26 is a Venn diagram illustrating conditions that can be correctly determined in the first embodiment and the second embodiment. A is a condition that satisfies a determination condition of a pseudo target due to electromagnetic noise corresponding to step ST52. B is a condition in which two different true targets satisfy a determination condition of a pseudo target due to electromagnetic noise corresponding to step ST52. C represents a condition in which a true target and a pseudo target due to electromagnetic noise overlap. From this figure, it can be seen that, in the first embodiment and the second embodiment, even if the condition A is satisfied, the determination cannot be made correctly on the condition B or C.

FIG. 27 is a Venn diagram illustrating conditions that can be correctly determined in the third embodiment. In the third embodiment, the condition B can be newly determined correctly, but the condition C cannot be determined correctly except for the conditions B and C (A state in which two different true targets satisfying A are overlapped with the pseudo target.).

FIG. 28 is a Venn diagram illustrating conditions that can be correctly determined in the fourth embodiment and the fifth embodiment. In the fourth embodiment and the fifth embodiment, all the conditions C can be determined correctly, and all the conditions A can be determined correctly.

Note that combinations of the respective embodiments, modifications of any components of the respective embodiments, or omissions of any components in the respective embodiments are possible.

INDUSTRIAL APPLICABILITY

The radar device according to the present disclosure can be used as an FCM system radar device.

REFERENCE SIGNS LIST

1: radar device, 11: radar signal output unit, 12: output control unit, 13: signal source, 14: divider, 15: transmission and reception unit, 16: transmission antenna, 17: reception antenna, 18: beat signal generating unit, 19: frequency mixing unit, 20: filter, 21: ADC, 22: signal processing unit, 23: range and speed calculating unit, 24: determination unit, 25: target detecting unit, 31: range and speed calculating circuit, 33: determination circuit, 34: target detecting circuit, 41: processor, 42: memory, 51: first spectrum calculating unit, 52: second spectrum calculating unit, 53: third spectrum calculating unit

The invention claimed is:

1. A radar device comprising:
processing circuitry performing a process:
to repeatedly output a frequency modulation signal;
to transmit the frequency modulation signal toward a target and receive a reflected wave from the target;
to generate a beat signal having a frequency of a difference between a frequency of the frequency modulation signal and a frequency of the reflected wave and convert the beat signal into digital data; and
to calculate a beat frequency corresponding to a range to the target and a Doppler frequency corresponding to a relative speed with respect to the target by using the digital data to detect the range and the relative speed of the target, wherein
the process outputs a first frequency modulation signal that changes in frequency with a preset first chirp slope and repeats in a preset first chirp period, a second frequency modulation signal that changes in frequency with a second chirp slope different from the first chirp slope and repeats in the first chirp period, and a third frequency modulation signal that changes in frequency with the second chirp slope and repeats in a second chirp period different from the first chirp period, and the process determines the target in the first frequency modulation signal and the target in the second frequency modulation signal as pseudo targets in a case where a beat frequency of the target in the first frequency modulation signal matches a beat frequency of the target in the second frequency modulation signal, and a Doppler frequency of the target in the first frequency modulation signal matches a Doppler frequency of the target in the second frequency modulation signal, wherein the process determines that the target in the first frequency modulation signal and the target in the second frequency modulation signal, determined to be the pseudo targets, are true targets in a case where a range of the target in the second frequency modulation signal matches a range of the target in the third frequency modulation signal, and a relative speed of the target in the second frequency modulation signal matches a relative speed of the target in the third frequency modulation signal, among the targets determined to be the pseudo targets in the first frequency modulation signal and the second frequency modulation signal, and the process determines that the target in the first frequency modulation signal and the target in the second frequency modulation signal, determined to be the pseudo targets, as targets due to electromagnetic noise when the relative speed of the target in the second frequency modulation does not match the relative speed of the target in the third frequency modulation, among the targets determined to be the pseudo targets in the first frequency modulation signal and the second frequency modulation signal.

2. The radar device according to claim 1, wherein the process outputs a fourth frequency modulation signal that changes in frequency with the first chirp slope and repeats in the second chirp period, and the process determines that the target in the first frequency modulation signal determined to be the true target is the pseudo target due to electromagnetic noise in a case where a range of the target in the first frequency modulation signal matches a range of the target in the fourth frequency modulation signal, and a relative speed of the target in the first frequency modulation signal does not match a relative speed of the target in the fourth frequency modulation signal, among the targets in the first frequency modulation signal determined to be the true target, and determines that the target in the first frequency modulation signal determined to be the pseudo target is a true target in a case where a range of the target in the first frequency modulation signal matches a range of the target in the fourth frequency modulation signal, and a relative speed of the target in the first frequency modulation signal matches a relative speed of the target in the fourth frequency modulation signal, among the targets in the first frequency modulation signal determined to be the pseudo target.

3. The radar device according to claim 1, wherein the process outputs a third frequency modulation signal that changes in frequency with the second chirp slope and repeats in a second chirp period different from the first chirp period and a fourth frequency modulation signal that changes in frequency with the first chirp slope and repeats in the second chirp period, and the process determines that the target in the first frequency modulation signal determined to be the pseudo target is a true target in a case where a range of the target in the first frequency modulation signal matches a range of the target in the fourth frequency modulation signal, and a relative speed of the target in the first frequency modulation signal matches a relative speed of the target in the fourth frequency modulation signal, among the targets determined to be the pseudo targets in the first frequency modulation signal and the second frequency modulation signal, and determines that the target in the second frequency modulation signal determined to be the pseudo target is a true target in a case where a range of the target in the second frequency modulation signal matches a range of the target in the third frequency modulation signal, and a relative speed of the target in the second frequency modulation signal matches a relative speed of the target in the third frequency modulation signal, among the targets determined to be the pseudo targets in the first frequency modulation signal and the second frequency modulation signal.

4. A radar device comprising:

processing circuitry performing a process:

to repeatedly output a frequency modulation signal;

to transmit the frequency modulation signal toward a target and receive a reflected wave from the target;

to generate a beat signal having a frequency of a difference between a frequency of the frequency modulation signal and a frequency of the reflected wave and convert the beat signal into digital data; and to calculate a beat frequency corresponding to a range to the target and a Doppler frequency corresponding to a relative speed with respect to the target by using the digital data to detect the range and the relative speed of the target, wherein the process outputs a first frequency modulation signal that changes in frequency with a preset first chirp slope and repeats in a preset first chirp period, a second frequency modulation signal that changes in frequency with a second chirp slope different from the first chirp slope and repeats in the first chirp period, and a third frequency modulation signal that changes in frequency with the second chirp slope and repeats in a second chirp period different from the first chirp period, and the process determines the target in the first frequency modulation signal and the target in the second frequency modulation signal as pseudo targets in a case where a beat frequency of the target in the first frequency modulation signal matches a beat frequency of the target in the second frequency modulation signal, and a Doppler frequency of the target in the first frequency modulation signal matches a Doppler frequency of the target in the second frequency modulation signal, wherein the process determines the target in the first frequency modulation signal and the target in the second frequency modulation signal as the pseudo targets in a case where a relative speed of the target in the first frequency modulation signal matches a relative speed of the target in the second frequency modulation signal, and a range of the target in the second frequency modulation signal matches a value obtained by multiplying a range of the target in the first frequency modulation signal by a ratio of the first chirp slope and the second chirp slope, wherein the process determines that the target in the first frequency modulation signal and the target in the second frequency modulation signal determined to be the pseudo targets are true targets in a case where a range of the target in the second frequency modulation signal matches a range of the target in the third frequency modulation signal, and a relative speed of the target in the second frequency modulation signal matches a relative speed of the target in the third frequency modulation signal, among the targets determined to be the pseudo targets in the first frequency modulation signal and the second frequency modulation signal.

5. The radar device according to claim 4, wherein the process outputs a fourth frequency modulation signal that changes in frequency with the first chirp slope and repeats in the second chirp period, and the process determines that the target in the first frequency modulation signal determined to be the true target is the pseudo target due to electromagnetic noise in a case where a range of the target in the first frequency modulation signal matches a range of the target in the fourth frequency modulation signal, and a relative speed of the target in the first frequency modulation signal does not match a relative speed of the target in the fourth frequency modulation signal, among the targets in the first frequency modulation signal determined to be the true target, and determines that the target in the first frequency modulation signal determined to be the pseudo target is a true target in a case where a range of the target in the first frequency modulation signal matches a range of the target in the fourth frequency modulation signal, and a relative speed of the target in the first frequency modulation signal matches a relative speed of the target in the fourth frequency modulation signal, among the targets in the first frequency modulation signal determined to be the pseudo target.

6. The radar device according to claim 4, wherein the process outputs a third frequency modulation signal that changes in frequency with the second chirp slope and repeats in a second chirp period different from the first chirp period and a fourth frequency modulation signal that changes in frequency with the first chirp slope and repeats in the second chirp period, and the process determines that the target in the first frequency modulation signal determined to be the pseudo target is a true target in a case where a range of the target in the first frequency modulation signal matches a range of the target in the fourth frequency modulation signal, and a relative speed of the target in the first frequency modulation signal matches a relative speed of the target in the fourth frequency modulation signal, among the targets determined to be the pseudo targets in the first frequency modulation signal and the second frequency modulation signal, and determines that the target in the second frequency modulation signal determined to be the pseudo target is a true target in a case where a range of the target in the second frequency modulation signal matches a range of the target in the third frequency modulation signal, and a relative speed of the target in the second frequency modulation signal matches a relative speed of the target in the third frequency modulation signal, among the targets determined to be the pseudo targets in the first frequency modulation signal and the second frequency modulation signal.

\* \* \* \* \*